US009668262B2

United States Patent
Uchino et al.

(10) Patent No.: US 9,668,262 B2
(45) Date of Patent: May 30, 2017

(54) MOBILE COMMUNICATION METHOD, RADIO BASE STATION, AND MOBILE STATION

(71) Applicant: NTT DOCOMO, INC., Tokyo (JP)

(72) Inventors: Tooru Uchino, Tokyo (JP); Yuta Sagae, Tokyo (JP); Sadayuki Abeta, Tokyo (JP); Hideaki Takahashi, Tokyo (JP); Anil Umesh, Tokyo (JP); Daisuke Nishikawa, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 61 days.

(21) Appl. No.: 14/385,653

(22) PCT Filed: Mar. 14, 2013

(86) PCT No.: PCT/JP2013/057196
§ 371 (c)(1),
(2) Date: Sep. 16, 2014

(87) PCT Pub. No.: WO2013/137392
PCT Pub. Date: Sep. 19, 2013

(65) Prior Publication Data
US 2015/0103762 A1    Apr. 16, 2015

(30) Foreign Application Priority Data

Mar. 16, 2012 (JP) ................................ 2012-061101

(51) Int. Cl.
H04W 4/00 (2009.01)
H04W 72/04 (2009.01)
(Continued)

(52) U.S. Cl.
CPC ......... H04W 72/048 (2013.01); H04L 5/0094 (2013.01); H04W 8/24 (2013.01);
(Continued)

(58) Field of Classification Search
USPC .......... 370/277–281, 328–345; 455/450–509
See application file for complete search history.

(56) References Cited

U.S. PATENT DOCUMENTS 8,437,705 B2 * 5/2013 Khoshnevis .......... H04L 1/0026
455/452.1
8,750,227 B2 * 6/2014 Lindoff ................. H04W 28/04
370/252
(Continued)

FOREIGN PATENT DOCUMENTS

WO    2010/145939 A1    12/2010
WO    2010145938 A1    12/2010
(Continued)

OTHER PUBLICATIONS

International Search Report issued in PCT/JP2013/057196 mailed on Jun. 18, 2013 (4 pages).
(Continued)

Primary Examiner — Man Phan
(74) Attorney, Agent, or Firm — Osha Liang LLP

(57) ABSTRACT

The present invention aims to reduce an insertion loss or the like caused by a diplexer inserted to reduce leakage from an uplink bandwidth to a downlink bandwidth of different bands, and thereby to improve a communication quality. A mobile communication method according to the present invention includes the steps of: transmitting simultaneous transmission capability information from a mobile station UE to a radio base station eNB, the simultaneous transmission capability information indicating whether or not the mobile station UE is able to transmit uplink data signal via multiple carriers in multiple bands within a same sub-frame in performing uplink CA; performing scheduling for the mobile station UE by the radio base station eNB based on the simultaneous transmission capability information; and performing communications by the mobile station UE based on the scheduling information.

12 Claims, 19 Drawing Sheets

(51) Int. Cl.
*H04W 8/24* (2009.01)
*H04L 5/00* (2006.01)
*H04L 5/14* (2006.01)

(52) U.S. Cl.
CPC ............ *H04L 5/001* (2013.01); *H04L 5/0044* (2013.01); *H04L 5/143* (2013.01)

(56) References Cited

U.S. PATENT DOCUMENTS

| | | | |
|---|---|---|---|
| 8,958,376 B2* | 2/2015 | Lindoff | H04W 28/04 370/329 |
| 9,001,750 B2* | 4/2015 | Zhang | H04W 8/22 370/328 |
| 9,066,347 B2* | 6/2015 | Ishii | H04W 8/24 |
| 9,072,104 B2* | 6/2015 | Maeda | H04W 72/082 |
| 9,137,804 B2* | 9/2015 | Lin | H04W 72/048 |
| 2012/0243450 A1 | 9/2012 | Ishii et al. | |
| 2012/0322455 A1 | 12/2012 | Oh | |
| 2013/0322394 A1 | 12/2013 | Ishii et al. | |
| 2014/0233524 A1* | 8/2014 | Jang | H04W 74/0833 370/329 |
| 2014/0376424 A1* | 12/2014 | Seo | H04L 1/0026 370/280 |
| 2015/0023268 A1* | 1/2015 | Uchino | H04W 72/0413 370/329 |
| 2015/0055556 A1* | 2/2015 | Takahashi | H04W 8/24 370/328 |

FOREIGN PATENT DOCUMENTS

| | | |
|---|---|---|
| WO | 2011/043392 A1 | 4/2011 |
| WO | 2011/105261 A1 | 9/2011 |
| WO | 2012/111638 A1 | 8/2012 |

OTHER PUBLICATIONS

Written Opinion of the International Searching Authority issued in PCT/JP2013/057196 mailed on Jun. 18, 2013 (9 pages).
Qualcomm Incorporated; "On channel bandwidth and Inter-band CA"; 3GPP TSG-RAN WG2 meeting #77, R2-120282; Dresden, Germany; Feb. 6-10, 2012 (3 pages).
3GPP TS 36.101 V10.4.0; "3rd Generation Partnership Project; Technical Specification Group Radio Access Network; Evolved Universal Terrestrial Radio Access (E-UTRA); User Equipment (UE) radio transmission and reception (Release 10)"; Sep. 2011 (243 pages).
Search Report issued in corresponding European Application No. 13760267.8, mailed Nov. 16, 2015 (6 pages).
NTT DOCOMO; "Further discussions on LTE-A UE categories/capabilities"; 3GPP TSG-RAN WG4 Ad-hoc meeting #2010-04, R4-103847; Xi'an, China; Oct. 11-15, 2010 (5 pages).
Ericsson et al.; "UE capability signalling for CA and UL/DL MIMO"; 3GPP TSG-RAN WG2 meeting #72bis, R2-110318; Dublin, Ireland; Jan. 17-21, 2011 (6 pages).
XP-002748137; "Carrier Aggregation"; Aug. 4, 2011; pp. 161-167 (7 pages).
Office Action issued in corresponding Japanese Application No. 2012-061101, mailed Oct. 6, 2015 (6 pages).
Extended European Search Report issued in corresponding European Application No. 13760267.8, mailed Mar. 23, 2016 (13 pages).

* cited by examiner

FIG. 3

*UE-EUTRA-Capability* information element

```
-- ASN1START

UE-EUTRA-Capability ::=        SEQUENCE {
...
    rf-Parameters                   RF-Parameters,
...
    },
    nonCriticalExtension            UE-EUTRA-Capability-v920-IEs     OPTIONAL
}

...
UE-EUTRA-Capability-v1020-IEs ::= SEQUENCE {
    ue-Category-v1020               INTEGER (6..8)                   OPTIONAL,
    phyLayerParameters-v1020        PhyLayerParameters-v1020         OPTIONAL,
    rf-Parameters-v1020             RF-Parameters-v1020              OPTIONAL,
    ...
}

...

RF-Parameters ::=              SEQUENCE {
    supportedBandListEUTRA          SupportedBandListEUTRA
}

RF-Parameters-v1020 ::=        SEQUENCE {
    supportedBandCombination-r10    SupportedBandCombination-r10
}

SupportedBandCombination-r10 ::= SEQUENCE (SIZE (1..maxBandComb-r10)) OF BandCombinationParameters-r10

BandCombinationParameters-r10 ::= SEQUENCE (SIZE (1..maxSimultaneousBands-r10)) OF BandParameters-r10

BandParameters-r10 ::= SEQUENCE {
    bandEUTRA-r10                   INTEGER (1..64),
    bandParametersUL-r10            BandParametersUL-r10             OPTIONAL,
    bandParametersDL-r10            BandParametersDL-r10             OPTIONAL
}

BandParametersUL-r10 ::= SEQUENCE (SIZE (1..maxBandwidthClass-r10)) OF CA-MIMO-ParametersUL-r10

CA-MIMO-ParametersUL-r10 ::= SEQUENCE {
    ca-BandwidthClassUL-r10         CA-BandwidthClass-r10,
    supportedMIMO-CapabilityUL-r10  MIMO-CapabilityUL-r10            OPTIONAL
}

BandParametersDL-r10 ::= SEQUENCE (SIZE (1..maxBandwidthClass-r10)) OF CA-MIMO-ParametersDL-r10

CA-MIMO-ParametersDL-r10 ::= SEQUENCE {
    ca-BandwidthClassDL-r10         CA-BandwidthClass-r10,
    supportedMIMO-CapabilityDL-r10  MIMO-CapabilityDL-r10            OPTIONAL
}

CA-BandwidthClass-r10 ::= ENUMERATED {a, b, c, d, e, f, ...,g}

...

-- ASN1STOP
```

| *UE-EUTRA-Capability* field descriptions |
|---|
| CA-BandwidthClass |
| The CA bandwidth class supported by the UE as defined in TS 36.101 [42, Table 5.6A-1]. |

FIG. 4

| CA Bandwidth Class | Aggregated Transmission Bandwidth Configuration | Maximum number of CC | Nominal Guard Band $BW_{GB}$ | Number of simultaneous transmission |
|---|---|---|---|---|
| A | $N_{RB,agg} \leq 100$ | 1 | $0.05 BW_{Channel(1)}$ | 1 |
| B | $N_{RB,agg} \leq 100$ | 2 | FFS | 2 |
| C | $100 < N_{RB,agg} \leq 200$ | 2 | $0.05\ max(BW_{Channel(1)}, BW_{Channel(2)})$ | FFS |
| D | $200 < N_{RB,agg} \leq [300]$ | FFS | FFS | FFS |
| E | $[300] < N_{RB,agg} \leq [400]$ | FFS | FFS | FFS |
| F | $[400] < N_{RB,agg} \leq [500]$ | FFS | FFS | FFS |
| G | $N_{RB,agg} \leq 100$ | 1 | FFS | 1 |

Note 1: $BW_{Channel(1)}$ and $BW_{Channel(2)}$ are channel bandwidths of two E-UTRA component carriers according to Table 5.6-1.

FIG. 5

*UE-EUTRA-Capability* information element

```
-- ASN1START

UE-EUTRA-Capability ::=          SEQUENCE {
    ...
    rf-Parameters                RF-Parameters,
    ...
    },
    nonCriticalExtension         UE-EUTRA-Capability-v920-IEs      OPTIONAL
}

...
UE-EUTRA-Capability-v1020-IEs ::=  SEQUENCE {
    ue-Category-v1020            INTEGER (6..8)                    OPTIONAL,
    phyLayerParameters-v1020     PhyLayerParameters-v1020          OPTIONAL,
    rf-Parameters-v1020          RF-Parameters-v1020               OPTIONAL,
    ...
}

...

RF-Parameters ::=                SEQUENCE {
    supportedBandListEUTRA       SupportedBandListEUTRA
}

RF-Parameters-v1020 ::=          SEQUENCE {
    supportedBandCombination-r10     SupportedBandCombination-r10
}

SupportedBandCombination-r10 ::= SEQUENCE (SIZE (1..maxBandComb-r10)) OF BandCombinationParameters-r10

BandCombinationParameters-r10 ::= SEQUENCE (SIZE (1..maxSimultaneousBands-r10)) OF BandParameters-r10

BandParameters-r10 ::= SEQUENCE {
    bandEUTRA-r10                INTEGER (1..64),
    bandParametersUL-r10         BandParametersUL-r10              OPTIONAL,
    bandParametersDL-r10         BandParametersDL-r10              OPTIONAL
}

BandParametersUL-r10 ::= SEQUENCE (SIZE (1..maxBandwidthClass-r10)) OF CA-MIMO-ParametersUL-r10

CA-MIMO-ParametersUL-r10 ::= SEQUENCE {
    ca-BandwidthClassUL-r10      CA-BandwidthClass-r10,
    supportedMIMO-CapabilityUL-r10   MIMO-CapabilityUL-r10         OPTIONAL
}

BandParametersDL-r10 ::= SEQUENCE (SIZE (1..maxBandwidthClass-r10)) OF CA-MIMO-ParametersDL-r10

CA-MIMO-ParametersDL-r10 ::= SEQUENCE {
    ca-BandwidthClassDL-r10      CA-BandwidthClass-r10,
    supportedMIMO-CapabilityDL-r10   MIMO-CapabilityDL-r10         OPTIONAL
}

CA-BandwidthClass-r10 ::= ENUMERATED {a, b, c, d, e, f, ...,g,h,i}

...

-- ASN1STOP
```

| *UE-EUTRA-Capability* field descriptions |
|---|
| *CA-BandwidthClass* |
| The CA bandwidth class supported by the UE as defined in TS 36.101 [42, Table 5.6A-1]. |

FIG. 6

| CA Bandwidth Class | Aggregated Transmission Bandwidth Configuration | Maximum number of CC | Nominal Guard Band $BW_{GB}$ | Number of simultaneous DL transmission | Number of simultaneous UL transmission |
|---|---|---|---|---|---|
| A | $N_{RB,agg} \leq 100$ | 1 | $0.05BW_{Channel(1)}$ | 1 | 1 |
| B | $N_{RB,agg} \leq 100$ | 2 | FFS | 2 | 2 |
| C | $100 < N_{RB,agg} \leq 200$ | 2 | $0.05\ max(BW_{Channel(1)}, BW_{Channel(2)})$ | FFS | FFS |
| D | $200 < N_{RB,agg} \leq [300]$ | FFS | FFS | FFS | FFS |
| E | $[300] < N_{RB,agg} \leq [400]$ | FFS | FFS | FFS | FFS |
| F | $[400] < N_{RB,agg} \leq [500]$ | FFS | FFS | FFS | FFS |
| G | $N_{RB,agg} \leq 100$ | 2 | FFS | 1 | 1 |
| H | $N_{RB,agg} \leq 100$ | 2 | FFS | 2 | 1 |
| I | $N_{RB,agg} \leq 100$ | 2 | FFS | 1 | 2 |

Note 1: $BW_{Channel(1)}$ and $BW_{Channel(2)}$ are channel bandwidths of two E-UTRA component carriers according to Table 5.6-1.

FIG. 7

*UE-EUTRA-Capability* information element

```
-- ASN1START
UE-EUTRA-Capability ::=         SEQUENCE {
...
    },
    nonCriticalExtension        UE-EUTRA-Capability-v920-IEs    OPTIONAL
}
UE-EUTRA-Capability-v920-IEs ::=    SEQUENCE   {
...
    nonCriticalExtension        UE-EUTRA-Capability-v940-IEs    OPTIONAL
}
UE-EUTRA-Capability-v940-IEs ::=    SEQUENCE {
    lateNonCriticalExtension    OCTET    STRING                 OPTIONAL,
    nonCriticalExtension        UE-EUTRA-Capability-v1020-IEs   OPTIONAL
}
UE-EUTRA-Capability-v1020-IEs ::=   SEQUENCE {
...
    nonCriticalExtension        UE-EUTRA-Capability-v11xy-IEs
    OPTIONAL
}
UE-EUTRA-Capability-v11xy-IEs ::=   SEQUENCE {
    rf-Parameters-v11xy             RF-Parameters-v11xy         OPTIONAL,
    nonCriticalExtension            SEQUENCE     {}             OPTIONAL
}
...
```

```
        EXAMPLE:SIMULTANEOUS TRANSMISSION CAPABILITY FOR EACH UE (DEFINED ONLY FOR UL)

Rf-Parameters-v11xy    ::=          SEQUENCE{
    supportedBandCombinationSimultaneous-r10    SupportedBandCombination-r10
    simultaneousTx-r11                              ENUMERATED{supported}       OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10               INTEGER    (1..64),
    bandParametersUL-r10        BandParametersUL-r10            OPTIONAL,
    bandParametersDL-r10        BandParametersDL-r10            OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10         CA-BandwidthClass-r10,
    supportedMIMO-CapabilityUL-r10  MIMO-CapabilityUL-r10       OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10         CA-BandwidthClass-r10,
    supportedMIMO-CapabilityDL-r10  MIMO-CapabilityDL-r10       OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 8

*UE-EUTRA-Capability* information element

```
-- ASN1START
UE-EUTRA-Capability ::=            SEQUENCE {
    ...
    },
    nonCriticalExtension              UE-EUTRA-Capability-v920-IEs     OPTIONAL
}
UE-EUTRA-Capability-v920-IEs  ::=   SEQUENCE {
    ...
    nonCriticalExtension              UE-EUTRA-Capability-v940-IEs     OPTIONAL
}
UE-EUTRA-Capability-v940-IEs ::=   SEQUENCE {
    lateNonCriticalExtension          OCTET    STRING                  OPTIONAL,
    nonCriticalExtension              UE-EUTRA-Capability-v1020-IEs    OPTIONAL
}
UE-EUTRA-Capability-v1020-IEs ::=   SEQUENCE {
    ...
    nonCriticalExtension              UE-EUTRA-Capability-v11xy-IEs
    OPTIONAL
}
UE-EUTRA-Capability-v11xy-IEs ::=   SEQUENCE {
    rf-Parameters-v11xy               RF-Parameters-v11xy              OPTIONAL,
    nonCriticalExtension              SEQUENCE   {}                    OPTIONAL
}
```

```
       EXAMPLE:SIMULTANEOUS TRANSMISSION/RECEPTION CAPABILITY FOR EACH UE (COMMON TO UL/DL)
```

```
Rf-Parameters-v11xy    ::=            SEQUENCE{
    supportedBandCombinationSimultaneous-r10       SupportedBandCombination-r10
    simultaneousTxRx-r11                           ENUMERATED{supported}         OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10                 INTEGER    (1..64),
    bandParametersUL-r10          BandParametersUL-r10             OPTIONAL,
    bandParametersDL-r10          BandParametersDL-r10             OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10       CA-BandwidthClass-r10,
    supportedMIMO-CapabilityUL-r10    MIMO-CapabilityUL-r10        OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10       CA-BandwidthClass-r10,
    supportedMIMO-CapabilityDL-r10    MIMO-CapabilityDL-r10        OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 9

*UE-EUTRA-Capability* information element

```
-- ASN1START
UE-EUTRA-Capability ::=            SEQUENCE {
...
    },
    nonCriticalExtension           UE-EUTRA-Capability-v920-IEs        OPTIONAL
}
UE-EUTRA-Capability-v920-IEs  ::=     SEQUENCE  {
...
    nonCriticalExtension              UE-EUTRA-Capability-v940-IEs        OPTIONAL
}
UE-EUTRA-Capability-v940-IEs ::=    SEQUENCE {
    lateNonCriticalExtension        OCTET     STRING                    OPTIONAL,
    nonCriticalExtension            UE-EUTRA-Capability-v1020-IEs         OPTIONAL
}
UE-EUTRA-Capability-v1020-IEs ::=    SEQUENCE {
    ...
    nonCriticalExtension            UE-EUTRA-Capability-v11xy-IEs
    OPTIONAL
}
UE-EUTRA-Capability-v11xy-IEs ::=   SEQUENCE {
    rf-Parameters-v11xy             RF-Parameters-v11xy                   OPTIONAL,
    nonCriticalExtension            SEQUENCE     {}                       OPTIONAL
}
```

| EXAMPLE:SIMULTANEOUS TRANSMISSION/RECEPTION CAPABILITY FOR EACH UE (SEPARATE FOR UL/DL) |
|---|

```
Rf-Parameters-v11xy    ::=           SEQUENCE{
    supportedBandCombinationSimultaneous-r10     SupportedBandCombination-r10
    simultaneousTx-r11                           ENUMERATED{supported}          OPTIONAL
    simultaneousRx-r11                           ENUMERATED{supported}          OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10                   INTEGER    (1..64),
    bandParametersUL-r10            BandParametersUL-r10                 OPTIONAL,
    bandParametersDL-r10            BandParametersDL-r10                 OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10         CA-BandwidthClass-r10,
    supportedMIMO-CapabilityUL-r10    MIMO-CapabilityUL-r10              OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10         CA-BandwidthClass-r10,
    supportedMIMO-CapabilityDL-r10    MIMO-CapabilityDL-r10              OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 10

UE-EUTRA-Capability information element

```
-- ASN1START
UE-EUTRA-Capability ::=            SEQUENCE {
 ...
   },
   nonCriticalExtension            UE-EUTRA-Capability-v920-IEs        OPTIONAL
}
UE-EUTRA-Capability-v920-IEs  ::=      SEQUENCE  {
 ...
   nonCriticalExtension                UE-EUTRA-Capability-v940-IEs    OPTIONAL
}
UE-EUTRA-Capability-v940-IEs ::=   SEQUENCE {
   lateNonCriticalExtension           OCTET    STRING                  OPTIONAL,
   nonCriticalExtension               UE-EUTRA-Capability-v1020-IEs    OPTIONAL
}
UE-EUTRA-Capability-v1020-IEs ::=  SEQUENCE {
   ...
   nonCriticalExtension              UE-EUTRA-Capability-v11xy-IEs
   OPTIONAL
}
UE-EUTRA-Capability-v11xy-IEs ::=     SEQUENCE {
    rf-Parameters-v11xy               RF-Parameters-v11xy               OPTIONAL,
    nonCriticalExtension              SEQUENCE   {}                     OPTIONAL
}
```

```
EXAMPLE:SIMULTANEOUS TRANSMISSION/RECEPTION CAPABILITY FOR EACH BAND COMBINATION (ONLY FOR UL)
```

```
Rf-Parameters-v11xy    ::=          SEQUENCE{
    supportedBandCombinationSimultaneous-r11      SupportedBandCombination-r11
}
SupportedBandCombination-r11 ::= SEQUENCE (SIZE ()) OF SupportedBandCombinationFarameters-11
SupportedBandCombinationParameters-r11 ::== SEQUENCE {
    bandCominationParameter-r10       BandCombinationParameters-r10
    simultaneousTx-r11                ENUMERATED{supported}            OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10                    INTEGER   (1..64),
    bandParametersUL-r10             BandParametersUL-r10              OPTIONAL,
    bandParametersDL-r10             BandParametersDL-r10              OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10          CA-BandwidthClass-r10,
    supportedMIMO-CapabilityUL-r10   MIMO-CapabilityUL-r10             OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10          CA-BandwidthClass-r10,
    supportedMIMO-CapabilityDL-r10   MIMO-CapabilityDL-r10             OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 11

UE-EUTRA-Capability information element

```
-- ASN1START
UE-EUTRA-Capability ::=         SEQUENCE {
    ...
    },
    nonCriticalExtension            UE-EUTRA-Capability-v920-IEs        OPTIONAL
}
UE-EUTRA-Capability-v920-IEs  ::=   SEQUENCE  {
    ...
    nonCriticalExtension                UE-EUTRA-Capability-v940-IEs        OPTIONAL
}
UE-EUTRA-Capability-v940-IEs ::=    SEQUENCE {
    lateNonCriticalExtension            OCTET    STRING                     OPTIONAL,
    nonCriticalExtension                UE-EUTRA-Capability-v1020-IEs       OPTIONAL
}
UE-EUTRA-Capability-v1020-IEs ::=   SEQUENCE {
    ...
    nonCriticalExtension            UE-EUTRA-Capability-v11xy-IEs
    OPTIONAL
}
UE-EUTRA-Capability-v11xy-IEs ::=   SEQUENCE {
    rf-Parameters-v11xy                 RF-Parameters-v11xy                 OPTIONAL,
    nonCriticalExtension                SEQUENCE    {}                      OPTIONAL
}
```

EXAMPLE:SIMULTANEOUS TRANSMISSION/RECEPTION CAPABILITY FOR EACH BAND COMBINATION (COMMON TO UL/DL)

```
Rf-Parameters-v11xy     ::=         SEQUENCE{
    supportedBandCombinationSimultaneous-r11        SupportedBandCombination-r11
}

SupportedBandCombination-r11 ::= SEQUENCE (SIZE ()) OF SupportedBandCombinationParameters-11

SupportedBandCombinationParameters-r11  ::= SEQUENCE {
    bandCominationParameter-r10     BandCombinationParameters-r10
    simultaneousTxRx-r11            ENUMERATED{supported}                   OPTIONAL
}
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10                   INTEGER   (1..64),
    bandParametersUL-r10            BandParametersUL-r10                    OPTIONAL,
    bandParametersDL-r10            BandParametersDL-r10                    OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10         CA-BandwidthClass-r10,
    supportedMIMO-CapabilityUL-r10  MIMO-CapabilityUL-r10                   OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10         CA-BandwidthClass-r10,
    supportedMIMO-CapabilityDL-r10  MIMO-CapabilityDL-r10                   OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 12

*UE-EUTRA-Capability* information element

```
-- ASN1START
UE-EUTRA-Capability ::=            SEQUENCE {
...
    },
    nonCriticalExtension           UE-EUTRA-Capability-v920-IEs         OPTIONAL
}
UE-EUTRA-Capability-v920-IEs  ::=  SEQUENCE {
...
    nonCriticalExtension           UE-EUTRA-Capability-v940-IEs         OPTIONAL
}
UE-EUTRA-Capability-v940-IEs ::=   SEQUENCE {
    lateNonCriticalExtension       OCTET   STRING                       OPTIONAL,
    nonCriticalExtension           UE-EUTRA-Capability-v1020-IEs        OPTIONAL
}
UE-EUTRA-Capability-v1020-IEs ::=  SEQUENCE {
    ...
    nonCriticalExtension           UE-EUTRA-Capability-v11xy-IEs
    OPTIONAL
}
UE-EUTRA-Capability-v11xy-IEs ::=  SEQUENCE {
    rf-Parameters-v11xy            RF-Parameters-v11xy                  OPTIONAL,
    nonCriticalExtension           SEQUENCE  {}                         OPTIONAL
}
```

EXAMPLE: SIMULTANEOUS TRANSMISSION/RECEPTION CAPABILITY FOR EACH BAND COMBINATION (SEPARATE FOR UL/DL)

```
Rf-Parameters-v11xy   ::=          SEQUENCE{
    supportedBandCombinationSimultaneous-r11    SupportedBandCombination-r11
}

SupportedBandCombination-r11 ::= SEQUENCE (SIZE ()) OF SupportedBandCombinationParameters-11

SupportedBandCombinationParameters-r11 ::= SEQUENCE {
    bandCominationParameter-r10    BandCombinationParameters-r10
    simultaneousTx-r11             ENUMERATED{supported}                OPTIONAL
    simultaneousRx-r11             ENUMERATED{supported}                OPTIONAL
}
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10                  INTEGER   (1..64),
    bandParametersUL-r10           BandParametersUL-r10                 OPTIONAL,
    bandParametersDL-r10           BandParametersDL-r10                 OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10        CA-BandwidthClass-r10,
    supportedMIMO-CapabilityUL-r10 MIMO-CapabilityUL-r10                OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10        CA-BandwidthClass-r10,
    supportedMIMO-CapabilityDL-r10 MIMO-CapabilityDL-r10                OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 13

*UE-EUTRA-Capability* information element

```
-- ASN1START
UE-EUTRA-Capability ::=          SEQUENCE {
    ...
    },
    nonCriticalExtension              UE-EUTRA-Capability-v920-IEs       OPTIONAL
}
UE-EUTRA-Capability-v920-IEs  ::=    SEQUENCE   {
    ...
    nonCriticalExtension              UE-EUTRA-Capability-v940-IEs       OPTIONAL
}
UE-EUTRA-Capability-v940-IEs ::=   SEQUENCE {
    lateNonCriticalExtension          OCTET    STRING                    OPTIONAL,
    nonCriticalExtension              UE-EUTRA-Capability-v1020-IEs      OPTIONAL
}
UE-EUTRA-Capability-v1020-IEs ::=  SEQUENCE {
    ...
    nonCriticalExtension              UE-EUTRA-Capability-v11xy-IEs
    OPTIONAL
}
UE-EUTRA-Capability-v11xy-IEs ::=    SEQUENCE {
    rf-Parameters-v11xy               RF-Parameters-v11xy                OPTIONAL,
    nonCriticalExtension              SEQUENCE  {}                       OPTIONAL
}
```

```
    EXAMPLE: SIMULTANEOUS TRANSMISSION/RECEPTION CAPABILITY FOR EACH BAND (ONLY FOR UL)
```

```
RF-Parameters-v11xy   ::=            SEQUENCE   {
    supportedBandCombination-r11          SupportedBandCombination-r11
}

SupportedBandCombination-r11 ::= SEQUENCE (SIZE (1..maxBandComb-r11)) OF BandCombinationParameters-
r11
    SupportedBandCombinationParameters-r11 ::= SEQUENCE {

BandCombinationParameters-r11 ::= SEQUENCE (SIZE (1..maxSimultaneousBands-r11)) OF BandParameters-
r11

BandParameters-r11 ::= SEQUENCE {
    bandEUTRA-r10                 INTEGER  (1..64),
    bandParametersUL-r10          BandParametersUL-r10                   OPTIONAL,
    bandParametersDL-r10          BandParametersDL-r10                   OPTIONAL
    simultaneousTx-r11            ENUMERATED{supported}                  OPTIONAL
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10                 INTEGER   (1..64),
    bandParametersUL-r10          BandParametersUL-r10                   OPTIONAL,
    bandParametersDL-r10          BandParametersDL-r10                   OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10           CA-BandwidthClass-r10,
    supportedMIMO-CapabilityUL-r10    MIMO-CapabilityUL-r10              OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10           CA-BandwidthClass-r10,
    supportedMIMO-CapabilityDL-r10    MIMO-CapabilityDL-r10              OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 14

*UE-EUTRA-Capability information element*

```
-- ASN1START
UE-EUTRA-Capability ::=        SEQUENCE {
    ...
    },
    nonCriticalExtension        UE-EUTRA-Capability-v920-IEs    OPTIONAL
}
UE-EUTRA-Capability-v920-IEs    ::=    SEQUENCE {
    ...
    nonCriticalExtension        UE-EUTRA-Capability-v940-IEs    OPTIONAL
}
UE-EUTRA-Capability-v940-IEs ::=    SEQUENCE {
    lateNonCriticalExtension    OCTET    STRING              OPTIONAL,
    nonCriticalExtension        UE-EUTRA-Capability-v1020-IEs   OPTIONAL
}
UE-EUTRA-Capability-v1020-IEs ::=    SEQUENCE {
    ...
    nonCriticalExtension        UE-EUTRA-Capability-v11xy-IEs
    OPTIONAL
}
UE-EUTRA-Capability-v11xy-IEs ::=    SEQUENCE {
    rf-Parameters-v11xy         RF-Parameters-v11xy             OPTIONAL,
    nonCriticalExtension        SEQUENCE    {}                  OPTIONAL
}
```

```
EXAMPLE: SIMULTANEOUS TRANSMISSION/RECEPTION CAPABILITY FOR EACH BAND (COMMON TO UL/DL)
```

```
RF-Parameters-v11xy    ::=        SEQUENCE {
    supportedBandCombination-r11    SupportedBandCombination-r11
}

SupportedBandCombination-r11 ::= SEQUENCE (SIZE (1..maxBandComb-r11)) OF BandCombinationParameters-r11

BandCombinationParameters-r11 ::= SEQUENCE (SIZE (1..maxSimultaneousBands-r11)) OF BandParameters-r11

BandParameters-r11 ::= SEQUENCE {
    bandEUTRA-r10               INTEGER    (1..64),
    bandParametersUL-r10        BandParametersUL-r10            OPTIONAL,
    bandParametersDL-r10        BandParametersDL-r10            OPTIONAL
    simultaneousTxRx-r11        ENUMERATED{supported}           OPTIONAL
}
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10               INTEGER    (1..64),
    bandParametersUL-r10        BandParametersUL-r10            OPTIONAL,
    bandParametersDL-r10        BandParametersDL-r10            OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10         CA-BandwidthClass-r10,
    supportedMIMO-CapabilityUL-r10  MIMO-CapabilityUL-r10       OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10         CA-BandwidthClass-r10,
    supportedMIMO-CapabilityDL-r10  MIMO-CapabilityDL-r10       OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 15

*UE-EUTRA-Capability* information element

```
-- ASN1START
UE-EUTRA-Capability ::=            SEQUENCE {
...
    },
    nonCriticalExtension           UE-EUTRA-Capability-v920-IEs         OPTIONAL
}
UE-EUTRA-Capability-v920-IEs  ::=  SEQUENCE   {
...
    nonCriticalExtension              UE-EUTRA-Capability-v940-IEs      OPTIONAL
}
UE-EUTRA-Capability-v940-IEs ::=   SEQUENCE {
    lateNonCriticalExtension       OCTET    STRING                      OPTIONAL,
    nonCriticalExtension           UE-EUTRA-Capability-v1020-IEs        OPTIONAL
}
UE-EUTRA-Capability-v1020-IEs ::=  SEQUENCE {
...
    nonCriticalExtension           UE-EUTRA-Capability-v11xy-IEs
    OPTIONAL
}
UE-EUTRA-Capability-v11xy-IEs ::=  SEQUENCE {
    rf-Parameters-v11xy            RF-Parameters-v11xy                  OPTIONAL,
    nonCriticalExtension           SEQUENCE    {}                       OPTIONAL
}
```

```
EXAMPLE:SIMULTANEOUS TRANSMISSION/RECEPTION CAPABILITY FOR EACH BAND (SEPARATE FOR UL/DL)
```

```
RF-Parameters-v11xy   ::=          SEQUENCE   {
    supportedBandCombination-r11          SupportedBandCombination-r11
}

SupportedBandCombination-r11 ::= SEQUENCE (SIZE (1..maxBandComb-r11)) OF BandCombinationParameters-
r11

BandCombinationParameters-r11 ::= SEQUENCE (SIZE (1..maxSimultaneousBands-r11)) OF BandParameters-
r11

BandParameters-r11 ::= SEQUENCE {
    bandEUTRA-r10                  INTEGER    (1..64),
    bandParametersUL-r10           BandParametersUL-r10                 OPTIONAL,
    bandParametersDL-r10           BandParametersDL-r10                 OPTIONAL
    simultaneousTx-r11             ENUMERATED{supported}                OPTIONAL
    simultaneousRx-r11             ENUMERATED{supported}                OPTIONAL
}
...
SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
    bandEUTRA-r10                  INTEGER    (1..64),
    bandParametersUL-r10           BandParametersUL-r10                 OPTIONAL,
    bandParametersDL-r10           BandParametersDL-r10                 OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10        CA-BandwidthClass-r10,
    supportedMIMO-CapabilityUL-r10 MIMO-CapabilityUL-r10                OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10        CA-BandwidthClass-r10,
    supportedMIMO-CapabilityDL-r10 MIMO-CapabilityDL-r10                OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 16
*UE-EUTRA-Capability* information element

```
-- ASN1START
UE-EUTRA-Capability ::=            SEQUENCE {
  ...
  },
  nonCriticalExtension             UE-EUTRA-Capability-v920-IEs      OPTIONAL
}
UE-EUTRA-Capability-v920-IEs  ::=  SEQUENCE {
  ...
  nonCriticalExtension             UE-EUTRA-Capability-v940-IEs      OPTIONAL
}
UE-EUTRA-Capability-v940-IEs ::=   SEQUENCE {
  lateNonCriticalExtension         OCTET    STRING                   OPTIONAL,
  nonCriticalExtension             UE-EUTRA-Capability-v1020-IEs     OPTIONAL
}
UE-EUTRA-Capability-v1020-IEs ::=  SEQUENCE {
  ...
  nonCriticalExtension             UE-EUTRA-Capability-v11xy-IEs
  OPTIONAL
}
UE-EUTRA-Capability-v11xy-IEs ::=  SEQUENCE {
  rf-Parameters-v11xy              RF-Parameters-v11xy               OPTIONAL,
  nonCriticalExtension             SEQUENCE    {}                    OPTIONAL
}
```

| EXAMPLE:SIMULTANEOUS TRANSMISSION/RECEPTION CAPABILITY FOR EACH CAbandClass (ONLY FOR UL) |
|---|

```
RF-Parameters-v11xy   ::=          SEQUENCE {
  supportedBandCombination-r11     SupportedBandCombination-r11
}

SupportedBandCombination-r11 ::= SEQUENCE (SIZE (1..maxBandComb-r11)) OF BandCombinationParameters-
r11

BandCombinationParameters-r11 ::= SEQUENCE (SIZE (1..maxSimultaneousBands-r11)) OF BandParameters-
r11

BandParameters-r11 ::= SEQUENCE {
  bandEUTRA-r10                    INTEGER  (1..64),
  bandParametersUL-r11             BandParametersUL-r11              OPTIONAL,
  bandParametersDL-r10             BandParametersDL-r10              OPTIONAL
}

BandParametersUL-r11 ::= SEQUENCE (SIZE (1..maxBandwidthClass-r11)) OF CA-MIMO-ParametersUL-r11

CA-MIMO-ParametersUL-r11 ::= SEQUENCE {
  ca-BandwidthClassUL-r10          CA-BandwidthClass-r10,
  simultaneousTx-r11               ENUMERATED{supported}             OPTIONAL
  supportedMIMO-CapabilityUL-r10   MIMO-CapabilityUL-r10             OPTIONAL
}
...

SupportedBandCombination-r10 ::= SEQUENCE (SIZE (1..maxBandComb-r10)) OF BandCombinationParameters-
r10
BandCombinationParameters-r10 ::= SEQUENCE (SIZE (1..maxSimultaneousBands-r10)) OF BandParameters-
r10
BandParameters-r10 ::= SEQUENCE {
  bandEUTRA-r10                    INTEGER  (1..64),
  bandParametersUL-r10             BandParametersUL-r10              OPTIONAL,
  bandParametersDL-r10             BandParametersDL-r10              OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
  ca-BandwidthClassUL-r10          CA-BandwidthClass-r10,
  supportedMIMO-CapabilityUL-r10   MIMO-CapabilityUL-r10             OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
  ca-BandwidthClassDL-r10          CA-BandwidthClass-r10,
  supportedMIMO-CapabilityDL-r10   MIMO-CapabilityDL-r10             OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 17

UE-EUTRA-Capability information element

```
-- ASN1START
UE-EUTRA-Capability ::=          SEQUENCE {
...
    },
    nonCriticalExtension         UE-EUTRA-Capability-v920-IEs    OPTIONAL
}
UE-EUTRA-Capability-v920-IEs ::=  SEQUENCE  {
...
    nonCriticalExtension         UE-EUTRA-Capability-v940-IEs    OPTIONAL
}
UE-EUTRA-Capability-v940-IEs ::= SEQUENCE {
    lateNonCriticalExtension     OCTET   STRING                  OPTIONAL,
    nonCriticalExtension         UE-EUTRA-Capability-v1020-IEs   OPTIONAL
}
UE-EUTRA-Capability-v1020-IEs ::= SEQUENCE {
...
    nonCriticalExtension         UE-EUTRA-Capability-v11xy-IEs
    OPTIONAL
}
UE-EUTRA-Capability-v11xy-IEs ::= SEQUENCE {
    rf-Parameters-v11xy          RF-Parameters-v11xy             OPTIONAL,
    nonCriticalExtension         SEQUENCE    {}                  OPTIONAL
}
```

EXAMPLE: SIMULTANEOUS TRANSMISSION/RECEPTION CAPABILITY FOR EACH CAbandClass (COMMON TO UL/DL)

```
RF-Parameters-v11xy    ::=       SEQUENCE  {
    supportedBandCombination-r11     SupportedBandCombination-r11
}

SupportedBandCombination-r11 ::= SEQUENCE (SIZE (1..maxBandComb-r11)) OF BandCombinationParameters-r11

BandCombinationParameters-r11 ::= SEQUENCE (SIZE (1..maxSimultaneousBands-r11)) OF BandParameters-r11

BandParameters-r11 ::= SEQUENCE {
    bandEUTRA-r10                INTEGER    (1..64),
    bandParametersUL-r11         BandParametersUL-r11            OPTIONAL,
    bandParametersDL-r11         BandParametersDL-r11            OPTIONAL
}

BandParametersUL-r11 ::= SEQUENCE (SIZE (1..maxBandwidthClass-r11)) OF CA-MIMO-ParametersUL-r11

CA-MIMO-ParametersUL-r11 ::= SEQUENCE {
    ca-BandwidthClassUL-r10      CA-BandwidthClass-r10,
    simultaneousTx-r11           ENUMERATED{supported}           OPTIONAL
    supportedMIMO-CapabilityUL-r10   MIMO-CapabilityUL-r10       OPTIONAL
}

BandParametersDL-r11 ::= SEQUENCE (SIZE (1..maxBandwidthClass-r11)) OF CA-MIMO-ParametersDL-r11

CA-MIMO-ParametersDL-r11 ::= SEQUENCE {
    ca-BandwidthClassDL-r10      CA-BandwidthClass-r10,
    simultaneousTxRx-r11         ENUMERATED{supported}           OPTIONAL
    supportedMIMO-CapabilityDL-r10   MIMO-CapabilityDL-r10       OPTIONAL
}
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10                INTEGER    (1..64),
    bandParametersUL-r10         BandParametersUL-r10            OPTIONAL,
    bandParametersDL-r10         BandParametersDL-r10            OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10      CA-BandwidthClass-r10,
    supportedMIMO-CapabilityUL-r10   MIMO-CapabilityUL-r10       OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10      CA-BandwidthClass-r10,
    supportedMIMO-CapabilityDL-r10   MIMO-CapabilityDL-r10       OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

FIG. 18

UE-EUTRA-Capability information element

```
-- ASN1START
UE-EUTRA-Capability ::=         SEQUENCE {
...
    },
    nonCriticalExtension        UE-EUTRA-Capability-v920-IEs        OPTIONAL
}
UE-EUTRA-Capability-v920-IEs    ::=    SEQUENCE    {
...
    nonCriticalExtension             UE-EUTRA-Capability-v940-IEs        OPTIONAL
}
UE-EUTRA-Capability-v940-IEs ::=   SEQUENCE {
    lateNonCriticalExtension         OCTET     STRING                    OPTIONAL,
    nonCriticalExtension             UE-EUTRA-Capability-v1020-IEs       OPTIONAL
}
UE-EUTRA-Capability-v1020-IEs ::=   SEQUENCE {
...
    nonCriticalExtension             UE-EUTRA-Capability-v11xy-IEs
    OPTIONAL
}
UE-EUTRA-Capability-v11xy-IEs ::=   SEQUENCE {
    rf-Parameters-v11xy              RF-Parameters-v11xy                 OPTIONAL,
    nonCriticalExtension             SEQUENCE      {}                    OPTIONAL
}
```

EXAMPLE:SIMULTANEOUS TRANSMISSION/RECEPTION CAPABILITY FOR EACH CAbandClass (SEPARATE FOR UL/DL)

```
RF-Parameters-v11xy    ::=         SEQUENCE    {
    supportedBandCombination-r11          SupportedBandCombination-r11
}

SupportedBandCombination-r11 ::= SEQUENCE (SIZE (1..maxBandComb-r11)) OF BandCombinationParameters-r11

BandCombinationParameters-r11 ::= SEQUENCE (SIZE (1..maxSimultaneousBands-r11)) OF BandParameters-r11

BandParameters-r11 ::= SEQUENCE {
    bandEUTRA-r10                    INTEGER    (1..64),
    bandParametersUL-r11             BandParametersUL-r11                OPTIONAL,
    bandParametersDL-r11             BandParametersDL-r11                OPTIONAL
}

BandParametersUL-r11 ::= SEQUENCE (SIZE (1..maxBandwidthClass-r11)) OF CA-MIMO-ParametersUL-r11

CA-MIMO-ParametersUL-r11 ::= SEQUENCE {
    ca-BandwidthClassUL-r10          CA-BandwidthClass-r10,
    simultaneousTx-r11               ENUMERATED{supported}
    supportedMIMO-CapabilityUL-r10   MIMO-CapabilityUL-r10               OPTIONAL
}

BandParametersDL-r11 ::= SEQUENCE (SIZE (1..maxBandwidthClass-r11)) OF CA-MIMO-ParametersDL-r11

CA-MIMO-ParametersDL-r11 ::= SEQUENCE {
    ca-BandwidthClassDL-r10          CA-BandwidthClass-r10,
    simultaneousTx-r11               ENUMERATED{supported}               OPTIONAL
    simultaneousRx-r11               ENUMERATED{supported}               OPTIONAL
    supportedMIMO-CapabilityDL-r10   MIMO-CapabilityDL-r10               OPTIONAL
}
...

SupportedBandCombination-r10 ::= SEQUENCE (SIZE (1..maxBandComb-r10)) OF BandCombinationParameters-r10
BandCombinationParameters-r10 ::= SEQUENCE (SIZE (1..maxSimultaneousBands-r10)) OF BandParameters-r10
BandParameters-r10 ::= SEQUENCE {
    bandEUTRA-r10                    INTEGER    (1..64),
    bandParametersUL-r10             BandParametersUL-r10                OPTIONAL,
    bandParametersDL-r10             BandParametersDL-r10                OPTIONAL
}
BandParametersUL-r10 ::= SEQUENCE (SIZE (1..maxBandwidthClass-r10)) OF CA-MIMO-ParametersUL-r10
CA-MIMO-ParametersUL-r10 ::= SEQUENCE {
    ca-BandwidthClassUL-r10          CA-BandwidthClass-r10,
    supportedMIMO-CapabilityUL-r10   MIMO-CapabilityUL-r10               OPTIONAL
}
BandParametersDL-r10 ::= SEQUENCE (SIZE (1..maxBandwidthClass-r10)) OF CA-MIMO-ParametersDL-r10
CA-MIMO-ParametersDL-r10 ::= SEQUENCE {
    ca-BandwidthClassDL-r10          CA-BandwidthClass-r10,
    supportedMIMO-CapabilityDL-r10   MIMO-CapabilityDL-r10               OPTIONAL
}
CA-BandwidthClass-r10 ::= ENUMERATED {a, b, c, d, e, f, ...}
MIMO-CapabilityUL-r10 ::= ENUMERATED {twoLayers, fourLayers}
MIMO-CapabilityDL-r10 ::= ENUMERATED {twoLayers, fourLayers, eightLayers}

-- ASN1STOP
```

MOBILE COMMUNICATION METHOD, RADIO BASE STATION, AND MOBILE STATION

TECHNICAL FIELD

The present invention relates to a mobile communication method, a radio base station, and a mobile station.

BACKGROUND ART

Presently, "Inter-band Carrier Aggregation (hereinafter, referred to as CA)" is being examined by the Development Conference of Long Term Evolution (hereinafter, referred to as LTE) Specifications.

As shown in FIG. 22, a radio configuration for implementing a conventional "Downlink Inter-band CA" for downlink includes a duplexer #A for switching transmission and reception in a band #A, a duplexer #B for switching transmission and reception in a band #B, and a diplexer for accommodating the duplexer #A and the duplexer #B.

PRIOR ART DOCUMENT

Non-Patent Document

Non-patent document 1: 3GPP TS36.101

SUMMARY OF THE INVENTION

In a radio configuration for implementing a conventional FDD mobile communication system, a duplexer is inserted into a port of the UE to block a leakage from an uplink bandwidth to a downlink bandwidth in a same band.

In the "Downlink Inter-band CA", since the UE transmits signal on a certain bandwidth while receiving signal from multiple bandwidths, insertion of a diplexer has been examined in order to prevent the uplink signal from leaking into and interfering with another bandwidth.

For example, as shown in FIG. 22, duplexers #A/#B are inserted to block leakages of signal from uplink bandwidths to downlink bandwidths in bands #A/#B (indicated with solid lines in FIG. 22).

In addition, a leakage of signal from an uplink bandwidth in the band #A to a downlink bandwidth in the band #B (indicated with a broken line in FIG. 22) is blocked by a diplexer inserted, as well.

Here, "REFSENS" and the like are provided in LTE (Release 8) to reduce influence of a signal leakage via the duplexer from an uplink bandwidth to a downlink bandwidth in a same band.

However, as for a signal leakage via the diplexer from an uplink bandwidth to a downlink bandwidth in different band, no measures have been taken against a case where signals are generated from multiple uplink bandwidths.

In particular, there are problems such as the transmission spurious emission caused by those signals, deterioration of the receiving sensitivity, and decrease of the transmission power.

In view of the foregoing problems, an objective of the present invention is to provide a mobile communication method, a radio base station, and a mobile station which are capable of lowering the blocking performance capability of a diplexer usually needed to block a leakage from the uplink bandwidth to the downlink bandwidth in the uplink CA, and owing to this effect, improving the transmission loss of the diplexer and the communication quality.

A first feature of the present invention is summarized as a mobile communication method in a mobile communication system capable of performing uplink carrier aggregation by using carriers of different frequencies, the mobile communication method including the steps of: transmitting simultaneous transmission capability information from a mobile station to a radio base station, the simultaneous transmission capability information indicating whether or not the mobile station is able to transmit uplink data signal via multiple carriers in multiple bands within a same sub-frame in performing uplink carrier aggregation; and performing scheduling for the mobile station by the radio base station based on the simultaneous transmission capability information.

A second feature of the present invention is summarized as a mobile communication method in a mobile communication system capable of performing uplink carrier aggregation by using carriers of different frequencies, the mobile communication method including the steps of: transmitting simultaneous transmission capability information from a mobile station to a radio base station, the simultaneous transmission capability information indicating whether or not the mobile station is able to ensure a predetermined communication quality when transmitting uplink data signal via multiple carriers in multiple bands within a same sub-frame in performing the uplink carrier aggregation; and performing scheduling for the mobile station by the radio base station based on the simultaneous transmission capability information.

A third feature of the present invention is summarized as a radio base station used in a mobile communication system capable of performing uplink carrier aggregation using carriers of different frequencies, the radio base station including: a receiver unit configured to receive simultaneous transmission capability information from a mobile station, the simultaneous transmission capability information indicating whether or not the mobile station is able to transmit uplink data signal via multiple carriers in multiple bands within a same sub-frame in performing uplink carrier aggregation; and a scheduling unit configured to perform scheduling for the mobile station based on the simultaneous transmission capability information.

A fourth feature of the present invention is summarized as a radio base station used in a mobile communication system capable of performing uplink carrier aggregation using carriers of different frequencies, the radio base station including: a receiver unit configured to receive simultaneous transmission capability information from a mobile station, the simultaneous transmission capability information indicating whether or not the mobile station is able to ensure a predetermined communication quality when transmitting uplink data signal via multiple carriers in multiple bands within a same sub-frame in performing uplink carrier aggregation; and a scheduling unit configured to perform scheduling for the mobile station based on the simultaneous transmission capability information.

A fifth feature of the present invention is summarized as a mobile station used in a mobile communication system capable of performing uplink carrier aggregation using carriers of different frequencies, the mobile station including a transmitter unit configured to transmit simultaneous transmission capability information to a radio base station, the simultaneous transmission capability information indicating whether or not the mobile station is able to transmit uplink data signal via multiple carriers in multiple bands within a same sub-frame in performing uplink carrier aggregation.

A sixth feature of the present invention is summarized as a mobile station used in a mobile communication system capable of performing uplink carrier aggregation using carriers of different frequencies, the mobile station including a transmitter unit configured to transmit simultaneous transmission capability information to a radio base station, the simultaneous transmission capability information indicating whether or not the mobile station is able to ensure a predetermined communication quality when transmitting uplink data signal via multiple carriers in multiple bands within a same sub-frame in performing uplink carrier aggregation.

A seventh feature of the present invention is summarized as a mobile communication method in a mobile communication system capable of performing uplink carrier aggregation by using carriers of different frequencies, the mobile communication method including the steps of: transmitting simultaneous transmission capability information from a mobile station to a radio base station, the simultaneous transmission capability information indicating whether or not the mobile station is able to transmit uplink data signal via multiple carriers transmitted from multiple antennas within a same sub-frame in performing uplink carrier aggregation; and performing scheduling for the mobile station by the radio base station based on the simultaneous transmission capability information.

A eighth feature of the present invention is summarized as a mobile communication method in a mobile communication system capable of performing uplink carrier aggregation by using carriers of different frequencies, the mobile communication method including the steps of: transmitting simultaneous transmission capability information from a mobile station to a radio base station, the simultaneous transmission capability information indicating whether or not the mobile station is able to ensure a predetermined communication quality when transmitting uplink data signal via multiple carriers transmitted from multiple antennas within a same sub-frame in performing uplink carrier aggregation; and performing scheduling for the mobile station by the radio base station based on the simultaneous transmission capability information.

A ninth feature of the present invention is summarized as a radio base station used in a mobile communication system capable of performing uplink carrier aggregation using carriers of different frequencies, the radio base station including: a receiver unit configured to receive simultaneous transmission capability information from a mobile station, the simultaneous transmission capability information indicating whether or not the mobile station is able to transmit uplink data signal via multiple carriers transmitted from multiple antennas within a same sub-frame in performing uplink carrier aggregation; and a scheduling unit configured to perform scheduling for the mobile station based on the simultaneous transmission capability information.

A tenth feature of the present invention is summarized as a radio base station used in a mobile communication system capable of performing uplink carrier aggregation using carriers of different frequencies, the radio base station including: a receiver unit configured to receive simultaneous transmission capability information from a mobile station, the simultaneous transmission capability information indicating whether or not the mobile station is able to ensure a predetermined communication quality when transmitting uplink data signal via multiple carriers transmitted from multiple antennas within a same sub-frame in performing uplink carrier aggregation; and a scheduling unit configured to perform scheduling for the mobile station based on the simultaneous transmission capability information.

A eleventh feature of the present invention is summarized as a mobile station used in a mobile communication system capable of performing uplink carrier aggregation using carriers of different frequencies, the mobile station including a transmitter unit configured to transmit simultaneous transmission capability information to a radio base station, the simultaneous transmission capability information indicating whether or not the mobile station is able to transmit uplink data signal via multiple carriers transmitted from multiple antennas within a same sub-frame in performing uplink carrier aggregation.

A twelfth feature of the present invention is summarized as a mobile station used in a mobile communication system capable of performing uplink carrier aggregation using carriers of different frequencies, the mobile station including a transmitter unit configured to transmit simultaneous transmission capability information to a radio base station, the simultaneous transmission capability information indicating whether or not the mobile station is able to ensure a predetermined communication quality when transmitting uplink data signal via multiple carriers transmitted from multiple antennas within a same sub-frame in performing uplink carrier aggregation.

BRIEF DESCRIPTION OF THE DRAWINGS

FIG. 3 is an example of "UE-EUTRA-Capability" transmitted by the mobile station according to the first embodiment of the present invention.

FIG. 4 is an example of "CA Bandwidth Class" in "UE-EUTRA-Capability" transmitted by the mobile station according to the first embodiment of the present invention.

FIG. 5 is an example of "UE-EUTRA-Capability" transmitted by the mobile station according to the first embodiment of the present invention.

FIG. 6 is an example of "CA Bandwidth Class" in "UE-EUTRA-Capability" transmitted by the mobile station according to the first embodiment of the present invention.

FIG. 7 is an example of "UE-EUTRA-Capability" transmitted by the mobile station according to the first embodiment of the present invention.

FIG. 8 is an example of "UE-EUTRA-Capability" transmitted by the mobile station according to the first embodiment of the present invention.

FIG. 9 is an example of "UE-EUTRA-Capability" transmitted by the mobile station according to the first embodiment of the present invention.

FIG. 10 is an example of "UE-EUTRA-Capability" transmitted by the mobile station according to the first embodiment of the present invention.

FIG. 11 is an example of "UE-EUTRA-Capability" transmitted by the mobile station according to the first embodiment of the present invention.

FIG. 12 is an example of "UE-EUTRA-Capability" transmitted by the mobile station according to the first embodiment of the present invention.

FIG. 13 is an example of "UE-EUTRA-Capability" transmitted by the mobile station according to the first embodiment of the present invention.

FIG. 14 is an example of "UE-EUTRA-Capability" transmitted by the mobile station according to the first embodiment of the present invention.

FIG. 15 is an example of "UE-EUTRA-Capability" transmitted by the mobile station according to the first embodiment of the present invention.

FIG. 16 is an example of "UE-EUTRA-Capability" transmitted by the mobile station according to the first embodiment of the present invention.

FIG. 17 is an example of "UE-EUTRA-Capability" transmitted by the mobile station according to the first embodiment of the present invention.

FIG. 18 is an example of "UE-EUTRA-Capability" transmitted by the mobile station according to the first embodiment of the present invention.

DETAILED DESCRIPTION

Mobile Communication System According to First Embodiment of Present Invention A mobile communication system according to a first embodiment of the present invention is described with reference to FIGS. 1 to 21.

The mobile communication system according to this embodiment supports LTE-Advanced, and is configured to perform at least one of "Inter-band CA (DL/UL)" and "Intra-band CA (DL/UL)".

Figure 1:
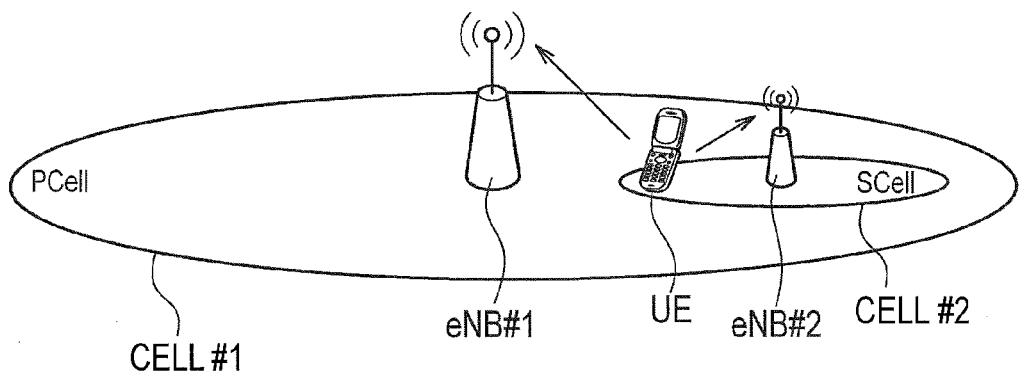
FIG. 1 is an overall configuration view of a mobile communication system according to a first embodiment of the present invention.

As shown in FIG. 1, the mobile communication system according to this embodiment includes a radio base station eNB#1 configured to manage a cell #1, and a radio base station eNB#2 configured to manage a cell #2 in a coverage area of the cell #1.

Here, the cell #1 denotes a cell (for example, a macro cell) operated by a frequency carrier in a coverage band (for example, a band #A) supporting a wide area, and the cell #2 denotes a cell (for example, a pico cell) operated by a frequency carrier in a capacity band (for example, a band #B) for improving the throughput in a hot spot.

In an example shown in FIG. 1, it is assumed that the cell #1 is set as "Pcell (Primary Cell) for the mobile station UE, and the cell #2 is set and activated as "Scell (Secondary Cell)" for the mobile station UE.

Figure 2:
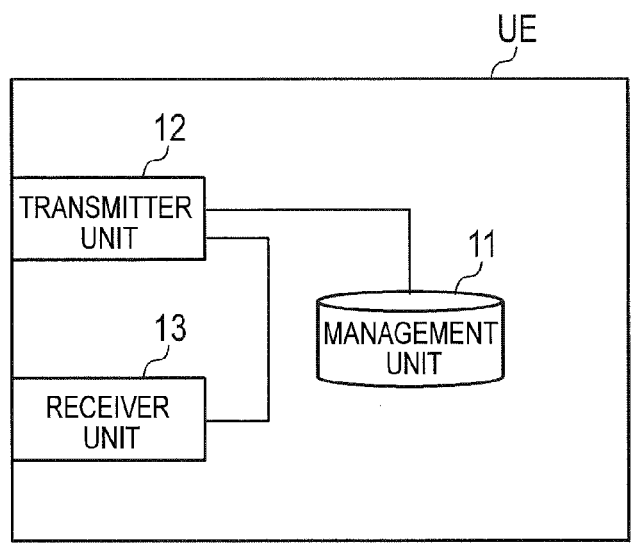
FIG. 2 is a functional block diagram of a mobile station according to the first embodiment of the present invention.

As shown in FIG. 2, the mobile station UE according to this embodiment includes a management unit 11, a receiver unit 13, and a transmitter unit 12.

The management unit 11 is configured to manage capability information of the mobile station UE. For example, the management unit 11 is configured to manage simultaneous transmission capability information as one kind of the capability information of the mobile station UE.

Here, the simultaneous transmission capability information may be information indicating whether or not the mobile station UE is able to transmit uplink data signal via multiple carriers in multiple bands within a same sub-frame in performing uplink CA, or may be information indicating whether or not the mobile station UE is able to ensure a predetermined communication quality when transmitting uplink data signal via multiple carriers in multiple bands within a same sub-frame in performing uplink CA.

In this specification, "information indicating whether or not the mobile station UE is able to transmit uplink data signal via multiple carriers in multiple bands within a same sub-frame in performing uplink CA" has the same meaning as "information indicating whether or not the mobile station UE is unable to transmit uplink data signal unless using one or more carriers in one band within a same sub-frame in performing uplink CA".

Similarly, in this specification, "information indicating whether or not the mobile station UE is able to ensure the predetermined communication quality when transmitting uplink data signal via multiple carriers in multiple bands within a same sub-frame in performing uplink CA" has the same meaning as "information indicating whether or not the mobile station UE is unable to ensure the predetermined communication quality unless transmitting uplink data signal via one or more carriers in one band within a same sub-frame in performing uplink CA".

Alternatively, simultaneous transmission capability information may be information indicating whether or not the mobile station UE is able to transmit uplink data signal via multiple carriers transmitted from multiple antennas within a same sub-frame in performing uplink CA, or may be information indicating whether or not the mobile station UE is able to ensure the predetermined communication quality when transmitting uplink data signal via multiple carriers transmitted from multiple antennas within a same sub-frame in performing uplink CA.

Further, in this specification, "information indicating whether or not the mobile station UE is able to transmit uplink data signal via multiple carriers transmitted from multiple antennas within a same sub-frame in performing uplink CA" has the same meaning as "information indicating whether or not the mobile station UE is unable to transmit uplink data signal unless using one or more carriers transmitted from a single antenna within a same sub-frame in performing uplink CA".

Similarly, in this specification, the above-mentioned information has the same meaning as "information indicating whether or not the mobile station UE is unable to ensure the predetermined communication quality unless transmitting uplink data signal via one or more carriers transmitted from a single antenna within a same sub-frame in performing uplink CA".

The receiver unit 13 is configured to receive various signals transmitted by the radio base station eNB.

For example, the receiver unit 13 may be configured to receive the scheduling signal in the uplink or downlink from the radio base station eNB.

The transmitter unit 12 is configured to transmit various signals to the radio base station eNB.

For example, the transmitter unit 12 may be configured to transmit the above-mentioned simultaneous transmission capability information as one kind of the capability information of the mobile station UE to the radio base station eNB.

As shown in FIG. 3, the transmitter unit 12 may be configured to transmit the simultaneous transmission capability information via "CA-BandwidthClass-r10" in "UE-EUTRA-Capability".

In this case, the mobile station UE and the radio base station eNB manage the table shown in FIG. 4. "Number of simultaneous transmission" associated with "CA-BandwidthClass-r10" indicates the number of multiple bands (or carriers in multiple bands) through which the mobile station UE is able to transmit uplink data signal within a same sub-frame in performing uplink CA, or the number of multiple bands (or carriers in multiple bands) through which the mobile station UE is able to ensure the predetermined communication quality when transmitting uplink data signal within a same sub-frame in performing uplink CA.

Alternatively, the mobile station UE and the radio base station eNB manage the table shown in FIG. 4. "Number of simultaneous transmission" associated with "CA-BandwidthClass-r10" indicates the number of multiple antennas (carriers transmitted from multiple antennas) through which the mobile station UE is able to transmit uplink data signal within a same sub-frame in performing uplink CA, or the number of multiple antennas (carriers transmitted from multiple antennas) through which the mobile station UE is able to ensure the predetermined communication quality when transmitting uplink data signal within a same sub-frame in performing uplink CA.

As shown in FIG. 5, the transmitter unit 12 may be configured to transmit the simultaneous transmission capability information via "CA-BandwidthClass-r10" in "UE-EUTRA-Capability".

In this case, the mobile station UE and the radio base station eNB manage the table shown in FIG. 6. "Number of simultaneous UL transmission" associated with "CA-BandwidthClass-r10" indicates the number of multiple bands (or multiple carriers in multiple bands) through which the mobile station UE is able to transmit uplink data signal within a same sub-frame in performing uplink CA, or the number of multiple bands (or multiple carriers in multiple bands) through which the mobile station UE is able to ensure the predetermined communication quality when transmitting uplink data signal within a same sub-frame in performing uplink CA. "Number of simultaneous DL transmission" associated with "CA-BandwidthClass-r10" indicates the number of multiple antennas (carriers transmitted from multiple antennas) through which the mobile station UE is able to receive downlink data signal within a same sub-frame in performing downlink CA, or the number of multiple antennas (carriers transmitted from multiple antennas) through which the mobile station UE is able to ensure a predetermined communication quality when receiving downlink data signal within a same sub-frame in performing downlink CA.

As shown in FIG. 7, the transmitter unit 12 may be configured to transmit the simultaneous transmission capability information via "simultaneousTx-r11" in "RF-Parameters-v11xy" in "UE-EUTRA-Capability-v11xy-IEs" in "UE-EUTRA-Capability".

In this case, by using "simultaneousTx-r11", the transmitter unit 12 notifies of only whether or not the mobile station UE is able to transmit uplink data signal via multiple carriers in multiple bands within a same sub-frame in performing uplink CA (or whether or not the mobile station UE is able to ensure the predetermined communication quality when transmitting uplink data signal via multiple carriers in multiple bands within a same sub-frame in performing uplink CA).

Alternatively, by using "simultaneousTx-r11", the transmitter unit 12 notifies of only whether or not the mobile station UE is able to transmit uplink data signal via multiple carriers transmitted from multiple antennas within a same sub-frame in performing uplink CA (or whether or not the mobile station UE is able to ensure the predetermined communication quality when transmitting uplink data signal via multiple carriers transmitted from multiple antennas within a same sub-frame in performing uplink CA).

As shown in FIG. 8, the transmitter unit 12 may be configured to transmit the simultaneous transmission capability information via "simultaneousTxRx-r11" in "RF-Parameters-v11xy" in "UE-EUTRA-Capability-v11xy-IEs" in "UE-EUTRA-Capability".

In this case, by using "simultaneousTxRx-r11", the transmitter unit 12 notifies of whether or not the mobile station UE is able to transmit uplink data signal via multiple carriers in multiple bands within a same sub-frame in performing uplink CA (or, whether or not the mobile station UE is able to ensure the predetermined communication quality when transmitting uplink data signal via multiple carriers in multiple bands within a same sub-frame in performing uplink CA), and whether or not the mobile station UE is able to receive downlink data signal via multiple carriers in multiple bands within a same sub-frame in performing downlink CA (or, whether or not the mobile station UE is able to ensure the predetermined communication quality when receiving downlink data signal via multiple carriers in multiple bands within a same sub-frame in performing downlink CA).

Alternatively, by using "simultaneousTxRx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA), and whether or not the mobile station UE is able to receive downlink data signal via multiple carriers transmitted from multiple antennas within a same sub-frame in performing downlink CA (or, whether or not the mobile station UE is able to ensure the predetermined communication quality when receiving downlink data signal via multiple carriers transmitted from multiple antennas within a same sub-frame in performing downlink CA).

As shown in FIG. 9, the transmitter unit 12 may be configured to transmit the simultaneous transmission capability information via "simultaneousTx-r11" and "simultaneousRx-r11" in "RF-Parameters-v11xy" in "UE-EUTRA-Capability-v11xy-IEs" in "UE-EUTRA-Capability".

In this case, the transmitter unit 12 notifies, by using "simultaneousTx-r11", of whether or not the mobile station UE is able to transmit uplink data signal via multiple carriers in multiple bands within a same sub-frame in performing uplink CA (or, whether or not the mobile station UE is able to ensure the predetermined communication quality when transmitting uplink data signal via multiple carriers in multiple bands within a same sub-frame in performing uplink CA). In addition, the transmitter unit 12 notifies, by using "simultaneousRx-r11", of whether or not the mobile station UE is able to receive downlink data signal via multiple carriers in multiple bands within a same sub-frame in performing downlink CA (or, whether or not the mobile station UE is able to ensure the predetermined communication quality when receiving downlink data signal via multiple carriers in multiple bands within a same sub-frame in performing downlink CA).

Alternatively, the transmitter unit 12 notifies, by using "simultaneousTx-r11", of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA). In addition, the transmitter unit 12 notifies, by using "simultaneousRx r-11", of whether or not the mobile station UE is able to receive downlink data signal via multiple carriers transmitted from multiple antennas within a same sub-frame in performing downlink CA (or, whether or not the mobile station UE is able to ensure the predetermined communication quality when receiving downlink data signal via multiple carriers transmitted from multiple antennas within a same sub-frame in performing downlink CA).

As shown in FIG. 10, the transmitter unit 12 may be configured to transmit the simultaneous transmission capability information via "simultaneousTx-r11" in "SupportedBandCombinationParameters-r11" in "SupportedBandCombination-r11" in "RF-Parameters-v11xy" in "UE-EUTRA-Capability-v11xy-IEs" in "UE-SUTRA-Capability".

In this case, for each band combination by using "simultaneousTx-r11", the transmitter unit 12 notifies of whether or not the mobile station UE is able to transmit uplink data signal via multiple carriers in multiple bands within a same sub-frame in performing uplink CA (or, whether or not the mobile station UE is able to ensure the predetermined communication quality when transmitting uplink data signal via multiple carriers in multiple bands within a same sub-frame in performing uplink CA).

Alternatively, for each band combination by using "simultaneousTx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA).

As shown in FIG. 11, the transmitter unit 12 may be configured to transmit the simultaneous transmission capability information via "simultaneousTxRx-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, for each band combination by using "simultaneousTxRx-r11", the transmitter unit 12 notifies of whether or not the mobile station UE is able to transmit uplink data signal via multiple carriers in multiple bands within a same sub-frame in performing uplink CA (or, whether or not the mobile station UE is able to ensure the predetermined communication quality when transmitting uplink data signal via multiple carriers in multiple bands within a same sub-frame in performing uplink CA), and whether or not the mobile station UE is able to receive downlink data signal via multiple carriers in multiple bands within a same sub-frame in performing downlink CA (or, whether or not the mobile station UE is able to ensure the predetermined communication quality when receiving downlink data signal via multiple carriers in multiple bands within a same sub-frame in performing downlink CA).

Alternatively, for each band combination by using "simultaneousTxRx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA), and whether or not the mobile station UE is able to receive downlink data signal via multiple carriers transmitted from multiple antennas within a same sub-frame in performing downlink CA (or, whether or not the mobile station UE is able to ensure the predetermined communication quality when receiving downlink data signal via multiple carriers transmitted from multiple antennas within a same sub-frame in performing downlink CA).

As shown in FIG. 12, the transmitter unit 12 may be configured to transmit the simultaneous transmission capability information via "simultaneousTx-r11" and "simultaneousRx-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, for each band combination by using "simultaneousTx-r11", the transmitter unit 12 notifies of whether or not the mobile station UE is able to transmit uplink data signal via multiple carriers in multiple bands within a same sub-frame in performing uplink CA (or, whether or not the mobile station UE is able to ensure the predetermined communication quality when transmitting uplink data signal via multiple carriers in multiple bands within a same sub-frame in performing uplink CA). In addition, for each band combination by using "simultaneousRx-r11", the transmitter unit 12 notifies of whether or not the mobile station UE is able to receive downlink data signal via multiple carriers in multiple bands within a same sub-frame in performing downlink CA (or, whether or not the mobile station UE is able to ensure the predetermined communication quality when receiving downlink data signal via multiple carriers in multiple bands within a same sub-frame in performing downlink CA).

Alternatively, for each band combination by using "simultaneousTx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA). In addition, for each band combination by using "simultaneousRx-r11", the transmitter unit 12 notifies of whether or not the mobile station UE is able to receive downlink data signal via multiple carriers transmitted from multiple antennas within a same sub-frame in performing downlink CA (or, whether or not the mobile station UE is able to ensure the predetermined communication quality when receiving downlink data signal via multiple carriers transmitted from multiple antennas within a same sub-frame in performing downlink CA).

As shown in FIG. 13, the transmitter unit 12 may be configured to transmit the simultaneous transmission capability information via "simultaneousTx-r11" in "Band Parameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, for each band by using "simultaneousTx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA).

As shown in FIG. 14, the transmitter unit 12 may be configured to transmit the simultaneous transmission capability information via "simultaneousTxRx-r11" in "BandParameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, for each band by using "simultaneousTxRx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA), and whether or not the mobile station UE is able to receive downlink data signal via multiple carriers transmitted from multiple antennas within a same sub-frame in performing downlink CA (or, whether or not the mobile station UE is able to ensure the predetermined communication quality when receiving downlink data signal via multiple carriers transmitted from multiple antennas within a same sub-frame in performing downlink CA).

As shown in FIG. 15, the transmitter unit 12 may be configured to transmit the simultaneous transmission capability information via "simultaneousTx-r11" and "simultaneousRx-r11" in "BandParameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, for each band by using "simultaneousTx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA). In addition, for each band by using "simultaneousRx-r11", the transmitter unit 12 notifies of whether or not the mobile station UE is able to receive downlink data signal via multiple carriers transmitted from multiple antennas within a same sub-frame in performing downlink CA (or, whether or not the mobile station UE is able to ensure the predetermined communication quality when receiving downlink data signal via multiple carriers transmitted from multiple antennas within a same sub-frame in performing downlink CA).

As shown in FIG. 16, the transmitter unit 12 may be configured to transmit the simultaneous transmission capability information via "simultaneousTx-r11" in "CA-MIMO-Parameters-r11" in "BandParameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, for each CAbandClass by using "simultaneousTx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA).

As shown in FIG. 17, the transmitter unit 12 may be configured to transmit the simultaneous transmission capability information via "simultaneousTxRx-r11" in "CA-MIMO-Parameters-r11" in "BandParameters-r11" in "SupportedBandCombinationParameters-r11" in "SupportedBandCombination-r11" in "RF-Parameters-v11xy" in "UE-EUTRA-Capability-v11xy-IEs" in "UE-EUTRA-Capability".

In this case, for each CAbandClass by using "simultaneousTxRx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA), and whether or not the mobile station UE is able to receive downlink data signal via multiple carriers transmitted from multiple antennas within a same sub-frame in performing downlink CA (or, whether or not the mobile station UE is able to ensure the predetermined communication quality when receiving downlink data signal via multiple carriers transmitted from multiple antennas within a same sub-frame in performing downlink CA).

As shown in FIG. 18, the transmitter unit 12 may be configured to transmit the simultaneous transmission capability information via "simultaneousTx-r11" and "simultaneousRx-r11" in "CA-MIMO-Parameters-r11" in "BandParameters-r11" in "supportedCombinationParameters-r11" in "SupportedBandCombination-r11" in "RF-Parameters-v11xy" in "UE-EUTRA-Capability-v11xy-IEs" in "UE-EUTRA-Capability".

In this case, for each CAbandClass by using "simultaneousTx-r11", the transmitter unit 12 notifies of whether or not the mobile station UE is able to transmit uplink data signal via multiple carriers transmitted from multiple antennas within a same sub-frame in performing uplink CA (or, whether or not the mobile station UE is able to ensure the predetermined communication quality when transmitting uplink data signal via multiple carriers transmitted from multiple antennas within a same sub-frame in performing uplink CA). In addition, for each CAbandClass by using "simultaneousRx-r11", the transmitter unit 12 notifies of whether or not the mobile station UE is able to receive downlink data signal via multiple carriers transmitted from multiple antennas within a same sub-frame in performing downlink CA (or, whether or not the mobile station UE is able to ensure the predetermined communication quality when receiving downlink data signal via multiple carriers transmitted from multiple antennas within a same sub-frame in performing downlink CA).

Furthermore, information indicating whether or not the mobile station UE is able to receive downlink data signal via multiple carriers in multiple bands within a same sub-frame in performing downlink CA (or, whether or not the mobile station UE is able to ensure the predetermined communication quality when receiving downlink data signal via multiple carriers in multiple bands within a same sub-frame in performing downlink CA) may be notified only when the mobile station UE (or radio base station eNB) supports "Cross Carrier Scheduling".

Alternatively, information indicating whether or not the mobile station UE is able to receive downlink data signal via multiple carriers transmitted from multiple antennas within a same sub-frame in performing downlink CA (or, whether or not the mobile station UE is able to ensure the predetermined communication quality when receiving downlink data signal via multiple carriers transmitted from multiple antennas within a same sub-frame in performing downlink CA) may be notified only when the mobile station UE (or radio base station eNB) supports "Cross Carrier Scheduling".

Figure 22:
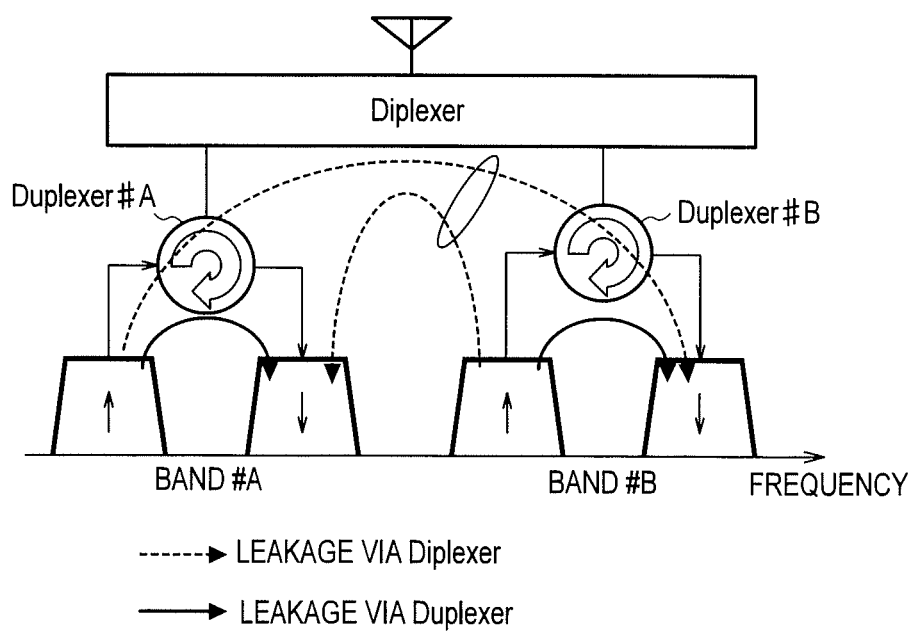
FIG. 22 is a diagram for illustrating problems of a conventional mobile communication system.

Here, the receiver unit 13 and the transmitter unit 12 of the mobile station UE may be configured to include a diplexer and a duplexer, as shown in FIG. 22.

Figure 19:
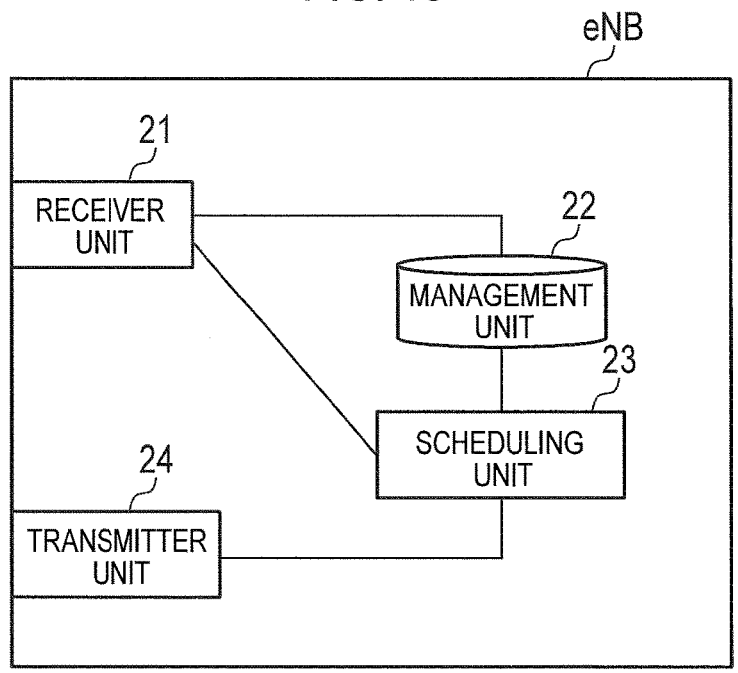
FIG. 19 is a functional block diagram of a radio base station according to the first embodiment of the present invention.

As shown in FIG. 19, the radio base station eNB includes a receiver unit 21, a management unit 22, a scheduling unit 23, and a transmitter unit 24.

The receiver unit 21 is configured to receive various signals transmitted by the mobile station UE.

For example, the receiver unit 21 may be configured to receive, from the mobile station US, the above-mentioned simultaneous transmission capability information as one kind of the capability information of the mobile station UE.

The management unit 22 is configured to manage the capability information of the mobile station UE. For example, the management unit 22 may be configured to manage the above-mentioned simultaneous transmission capability information as one kind of the capability information of the mobile station UE.

The scheduling unit 23 is configured to perform the scheduling processing for the mobile station UE.

For example, the scheduling unit 23 may be configured to perform the scheduling processing for the mobile station UE based on the capability information (above-mentioned simultaneous transmission capability information) of the mobile station UE managed by the management unit 22.

Figure 20:
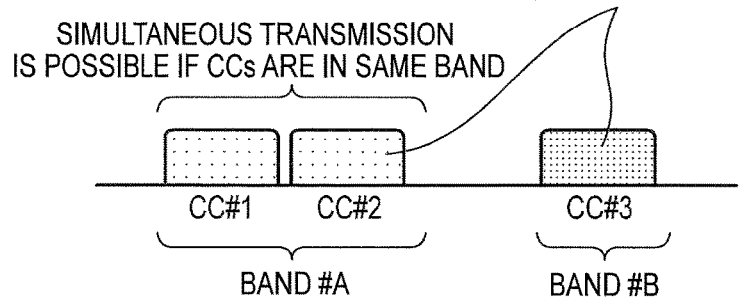
FIG. 20 is a diagram showing an example of scheduling by the radio base station according to the first embodiment of the present invention.

Specifically, as shown in FIG. 20, the scheduling unit may be configured to perform scheduling such that a scheduling target mobile station UE will not transmit uplink data signal via multiple carriers in multiple bands within a same sub-frame in performing uplink CA, if the mobile station UE is unable to transmit uplink data signal via multiple carriers in multiple bands within a same sub-frame in performing uplink CA (that is, if the mobile station UE is unable to transmit uplink data signal unless using one or more carriers in one band within a same sub-frame in performing uplink CA), or if the mobile station UE is unable to ensure the predetermined communication quality when transmitting uplink data signal via multiple carriers in multiple bands within a same sub-frame in performing uplink CA (that is, if the mobile station UE is unable to ensure the predetermined communication quality unless transmitting uplink data signal via one or more carriers in one band within a same sub-frame in performing uplink CA).

In this case, in an example shown in FIG. 20, the scheduling unit 23 may be configured to perform scheduling such that the mobile station UE will avoid transmission of uplink data signal via CC #1 (or, CC #2) in the band #A and via CC #3 in the band #B within a same sub-frame in performing uplink CA.

However, even in this case, the scheduling unit 23 may perform scheduling such that the mobile station UE will transmit uplink data signal via CC #1 and CC #2 in the same band #A within a same sub-frame in performing uplink CA.

Figure 21:
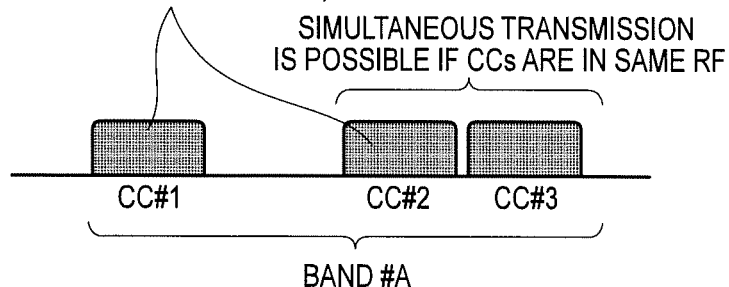
FIG. 21 is a diagram showing an example of scheduling by the radio base station according to the first embodiment of the present invention.

Alternatively, as shown in FIG. 21, the scheduling unit 23 may be configured to perform scheduling such that the scheduling target mobile station UE will not transmit uplink data signal via multiple carriers transmitted from multiple antennas within a same sub-frame in performing uplink CA, if the mobile station UE is unable to transmit uplink data signal via multiple carriers transmitted from multiple antennas within a same sub-frame in performing uplink CA (that is, if the mobile station UE is unable to transmit uplink data signal unless using one or more carriers transmitted from a single antenna within a same sub-frame in performing uplink CA), or if the mobile station UE is unable to ensure the predetermined communication quality when transmitting uplink data signal via multiple carriers transmitted from multiple antennas within a same sub-frame in performing uplink CA (that is, if the mobile station UE is unable to ensure the predetermined communication quality unless transmitting uplink data signal via one or more carriers transmitted from a single antenna within a same sub-frame in performing uplink CA).

In this case, in an example shown in FIG. 21, the scheduling unit 23 may be configured to perform scheduling such that the mobile station UE will avoid transmission of uplink data signal via CC #1 in the band #A transmitted from an antenna (RF) #1 and CC #2 (or CC #3) in the band #A transmitted from an antenna (RF) #2 within a same sub-frame in performing uplink CA.

However, even in this case, the scheduling unit 23 may perform scheduling such that the mobile station UE will transmit uplink data signal via CC #2 and CC #3 in the band #A transmitted through a same antenna (RF) within a same sub-frame in performing uplink CA.

The transmitter unit 24 is configured to transmit various kinds of signal to the mobile station UE.

For example, the transmitter unit 24 may be configured to transmit the scheduling signal to the mobile station UE.

Here, a mobile station UE unable to transmit uplink data signal via multiple carriers in multiple bands within a same sub-frame in performing uplink CA as described above may have a function of transmitting only CCs in the same band as a CC through which important signal is transmitted, when the radio base station eNB erroneously allocates multiple CCs to the mobile station UE.

Alternatively, a mobile station UE unable to transmit uplink data signal via multiple carriers transmitted from multiple antennas within a same sub-frame in performing uplink CA as described above may have a function of transmitting only CCs transmitted from the same antenna as a CC through which important signal is transmitted, when the radio base station eNB erroneously allocates multiple CCs to the mobile station UE.

For example, since the PUCCH is signal having significance higher than the PUSCH, the mobile station UE may have a function of performing transmission only in an uplink band to which the PUCCH is allocated, in preference to the PUCCH.

In the above case, the simultaneous transmission is performed and the communication quality in this transmission may deteriorate significantly. However, such deterioration does not matter.

According to embodiments of the present invention, the mobile station UE is configured to transmit the above-mentioned simultaneous transmission capability information to the radio base station eNB, and the radio base station eNB is configured to perform scheduling based on the simultaneous transmission capability information. In such a configuration, since transmission is not made within a same sub-frame, leakage from an uplink bandwidth to a downlink bandwidth in different bands can be blocked by a simple diplexer. Consequently, communication with a communication capability set to use of a single uplink bandwidth can be implemented.

The features of the above-described embodiment may also be expressed as follows.

A first feature of this embodiment is summarized as a mobile communication method in a mobile communication system capable of performing uplink CA (carrier aggregation) by using carriers of different frequencies, the mobile communication method including the steps of: transmitting simultaneous transmission capability information from a mobile station UE to a radio base station eNB, the simultaneous transmission capability information indicating whether or not the mobile station UE is able to transmit uplink data signal via multiple carriers in multiple bands within a same sub-frame in performing uplink CA; and performing scheduling for the mobile station UE by the radio base station eNB based on the simultaneous transmission capability information.

A second feature of this embodiment is summarized as a mobile communication method in a mobile communication system capable of performing uplink CA by using carriers of different frequencies, the mobile communication method including the steps of: transmitting simultaneous transmission capability information from a mobile station UE to a radio base station eNB, the simultaneous transmission capability information indicating whether or not the mobile station UE is able to ensure a predetermined communication quality when transmitting uplink data signal via multiple carriers in multiple bands within a same sub-frame in performing the uplink CA; and performing scheduling for the mobile station UE by the radio base station eNB based on the simultaneous transmission capability information.

A third feature of this embodiment is summarized as a radio base station eNB used in a mobile communication system capable of performing uplink CA using carriers of different frequencies, the radio base station eNB including: a receiver unit 21 configured to receive simultaneous transmission capability information from a mobile station UE, the simultaneous transmission capability information indicating whether or not the mobile station UE is able to transmit uplink data signal via multiple carriers in multiple bands within a same sub-frame in performing uplink CA; and a scheduling unit 23 configured to perform scheduling for the mobile station UE based on the simultaneous transmission capability information.

A fourth feature of this embodiment is summarized as a radio base station eNB used in a mobile communication system capable of performing uplink CA using carriers of different frequencies, the radio base station eNB including: a receiver unit 21 configured to receive simultaneous transmission capability information from a mobile station UE, the simultaneous transmission capability information indicating whether or not the mobile station UE is able to ensure a predetermined communication quality when transmitting uplink data signal via multiple carriers in multiple bands within a same sub-frame in performing uplink CA; and a scheduling unit 23 configured to perform scheduling for the mobile station UE based on the simultaneous transmission capability information.

A fifth feature of this embodiment is summarized as a mobile station UE used in a mobile communication system capable of performing uplink CA using carriers of different frequencies, the mobile station UE including a transmitter unit 12 configured to transmit simultaneous transmission capability information to a radio base station eNB, the simultaneous transmission capability information indicating whether or not the mobile station UE is able to transmit uplink data signal via multiple carriers in multiple bands within a same sub-frame in performing uplink CA.

A sixth feature of this embodiment is summarized as a mobile station UE used in a mobile communication system capable of performing uplink CA using carriers of different frequencies, the mobile station UE including a transmitter unit 12 configured to transmit simultaneous transmission capability information to a radio base station eNB, the simultaneous transmission capability information indicating whether or not the mobile station UE is able to ensure a predetermined communication quality when transmitting uplink data signal via multiple carriers in multiple bands within a same sub-frame in performing uplink CA.

A seventh feature of this embodiment is summarized as a mobile communication method in a mobile communication system capable of performing uplink CA by using carriers of different frequencies, the mobile communication method including the steps of: transmitting simultaneous transmission capability information from a mobile station UE to a radio base station eNB, the simultaneous transmission capability information indicating whether or not the mobile station UE is able to transmit uplink data signal via multiple carriers transmitted from multiple antennas within a same sub-frame in performing uplink CA; and performing scheduling for the mobile station UE by the radio base station eNB based on the simultaneous transmission capability information.

A eighth feature of this embodiment is summarized as a mobile communication method in a mobile communication system capable of performing uplink CA by using carriers of different frequencies, the mobile communication method including the steps of: transmitting simultaneous transmission capability information from a mobile station UE to a radio base station eNB, the simultaneous transmission capability information indicating whether or not the mobile station UE is able to ensure a predetermined communication quality when transmitting uplink data signal via multiple carriers transmitted from multiple antennas within a same sub-frame in performing uplink CA; and performing scheduling for the mobile station UE by the radio base station eNB based on the simultaneous transmission capability information.

A ninth feature of this embodiment is summarized as a radio base station eNB used in a mobile communication system capable of performing uplink CA using carriers of different frequencies, the radio base station eNB including: a receiver unit 21 configured to receive simultaneous transmission capability information from a mobile station UE, the simultaneous transmission capability information indicating whether or not the mobile station UE is able to transmit uplink data signal via multiple carriers transmitted from multiple antennas within a same sub-frame in performing uplink CA; and a scheduling unit 23 configured to perform scheduling for the mobile station UE based on the simultaneous transmission capability information.

A tenth feature of this embodiment is summarized as a radio base station eNB used in a mobile communication system capable of performing uplink CA using carriers of different frequencies, the radio base station eNB including: a receiver unit 21 configured to receive simultaneous transmission capability information from a mobile station UE, the simultaneous transmission capability information indicating whether or not the mobile station UE is able to ensure a predetermined communication quality when transmitting uplink data signal via multiple carriers transmitted from multiple antennas within a same sub-frame in performing uplink CA; and a scheduling unit 23 configured to perform scheduling for the mobile station UE based on the simultaneous transmission capability information.

A eleventh feature of this embodiment is summarized as a mobile station UE used in a mobile communication system capable of performing uplink CA using carriers of different frequencies, the mobile station UE including a transmitter unit 12 configured to transmit simultaneous transmission capability information to a radio base station eNB, the simultaneous transmission capability information indicating whether or not the mobile station UE is able to transmit uplink data signal via multiple carriers transmitted from multiple antennas within a same sub-frame in performing uplink CA.

A twelfth feature of this embodiment is summarized as a mobile station UE used in a mobile communication system capable of performing uplink CA using carriers of different frequencies, the mobile station UE including a transmitter unit 12 configured to transmit simultaneous transmission capability information to a radio base station eNB, the simultaneous transmission capability information indicating whether or not the mobile station UE is able to ensure a predetermined communication quality when transmitting uplink data signal via multiple carriers transmitted from multiple antennas within a same sub-frame in performing uplink CA.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-061101 (filed on Mar. 16, 2012) is incorporated by reference in the present specification.

INDUSTRIAL APPLICABILITY

As described above, the present invention provides a mobile communication method, a radio base station, and a mobile station, which are capable of lowering the blocking performance capability of a diplexer usually needed to block the leakage from the uplink bandwidth to the downlink bandwidth, and owing to this effect, improving the transmission loss of the diplexer and the communication quality.

EXPLANATION OF THE REFERENCE NUMERALS

UE mobile station
eNB radio base station
11, 22 management unit
12, 24 transmitter unit
13, 21 receiver unit
23 scheduling unit

The invention claimed is:

1. A mobile communication method in a mobile communication system for performing uplink carrier aggregation by using carriers of different frequencies, the mobile communication method comprising the steps of:

transmitting simultaneous transmission capability information from a mobile station to a radio base station, the simultaneous transmission capability information indicating whether or not the mobile station is able to transmit uplink data signal via multiple carriers in multiple bands within a same sub-frame in performing uplink carrier aggregation; and performing scheduling for the mobile station by the radio base station based on the simultaneous transmission capability information, wherein if the mobile station is unable to transmit uplink data signal via the multiple carriers in the multiple bands within the same sub-frame in performing uplink carrier aggregation, the radio base station performs scheduling that does not transmit uplink data signal via the multiple carriers in the multiple bands and performs scheduling that transmits uplink data signal via multiple carriers in a same band, wherein the mobile station is unable to transmit uplink data signal via the multiple carriers in the multiple bands, when the radio base station allocates the multiple carriers in the multiple bands to the mobile station, the mobile station transmits uplink data signal via a carrier in a same band as a carrier which an important signal is transmitted.

2. A mobile communication method in a mobile communication system for performing uplink carrier aggregation by using carriers of different frequencies, the mobile communication method comprising the steps of:

transmitting simultaneous transmission capability information from a mobile station to a radio base station, the simultaneous transmission capability information indicating whether or not the mobile station is able to ensure a predetermined communication quality when transmitting uplink data signal via multiple carriers in multiple bands within a same sub-frame in performing the uplink carrier aggregation; and performing scheduling for the mobile station by the radio base station based on the simultaneous transmission capability information, wherein if the mobile station is unable to ensure the predetermined communication quality when transmitting uplink data signal via the multiple carriers in the multiple bands within the same sub-frame in performing uplink carrier aggregation, the radio base station performs scheduling that does not transmit uplink data signal via the multiple carriers in the multiple bands and performs scheduling that transmits uplink data signal via multiple carriers in a same band, wherein the mobile station is unable to transmit uplink data signal via the multiple carriers in the multiple bands, when the radio base station allocates the multiple carriers in the multiple bands to the mobile station, the mobile station transmits uplink data signal via a carrier in a same band as a carrier which an important signal is transmitted.

3. A radio base station used in a mobile communication system for performing uplink carrier aggregation using carriers of different frequencies, the radio base station comprising:

a receiver unit configured to receive simultaneous transmission capability information from a mobile station, the simultaneous transmission capability information indicating whether or not the mobile station is able to transmit uplink data signal via multiple carriers in multiple bands within a same sub-frame in performing uplink carrier aggregation; and a scheduling unit configured to perform scheduling for the mobile station based on the simultaneous transmission capability information, wherein if the mobile station is unable to transmit uplink data signal via the multiple carriers in the multiple bands within the same sub-frame in performing uplink carrier aggregation, the radio base station performs scheduling that does not transmit uplink data signal via the multiple carriers in the multiple bands and performs scheduling that transmits uplink data signal via multiple carriers in a same band, wherein the mobile station is unable to transmit uplink data signal via the multiple carriers in the multiple bands, when the radio base station allocates the multiple carriers in the multiple bands to the mobile station, the mobile station transmits uplink data signal via a carrier in a same band as a carrier which an important signal is transmitted.

4. A radio base station used in a mobile communication system for performing uplink carrier aggregation using carriers of different frequencies, the radio base station comprising:

a receiver unit configured to receive simultaneous transmission capability information from a mobile station, the simultaneous transmission capability information indicating whether or not the mobile station is able to ensure a predetermined communication quality when transmitting uplink data signal via multiple carriers in multiple bands within a same sub-frame in performing uplink carrier aggregation; and a scheduling unit configured to perform scheduling for the mobile station based on the simultaneous transmission capability information, wherein if the mobile station is unable to ensure the predetermined communication quality when transmitting uplink data signal via the multiple carriers in the multiple bands within the same sub-frame in performing uplink carrier aggregation, the radio base station performs scheduling that does not transmit uplink data signal via the multiple carriers in the multiple bands and performs scheduling that transmits uplink data signal via multiple carriers in a same band, wherein the mobile station is unable to transmit uplink data signal via the multiple carriers in the multiple bands, when the radio base station allocates the multiple carriers in the multiple bands to the mobile station, the mobile station transmits uplink data signal via a carrier in a same band as a carrier which an important signal is transmitted.

5. A mobile station used in a mobile communication system for performing uplink carrier aggregation using carriers of different frequencies, the mobile station comprising a transmitter unit configured to transmit simultaneous transmission capability information to a radio base station, the simultaneous transmission capability information indicating whether or not the mobile station is able to transmit uplink data signal via multiple carriers in multiple bands within a same sub-frame in performing uplink carrier aggregation, wherein if the mobile station is unable to transmit uplink data signal via the multiple carriers in the multiple bands within the same sub-frame in performing uplink carrier aggregation, the radio base station performs scheduling that does not transmit uplink data signal via the multiple carriers in the multiple bands and performs scheduling that transmits uplink data signal via multiple carriers in a same band, wherein the mobile station is unable to transmit uplink data signal via the multiple carriers in the multiple bands, when the radio base station allocates the multiple carriers in the multiple bands to the mobile station, the mobile station transmits uplink data signal via a carrier in a same band as a carrier which an important signal is transmitted.

6. A mobile station used in a mobile communication system for performing uplink carrier aggregation using carriers of different frequencies, the mobile station comprising a transmitter unit configured to transmit simultaneous transmission capability information to a radio base station, the simultaneous transmission capability information indicating whether or not the mobile station is able to ensure a predetermined communication quality when transmitting uplink data signal via multiple carriers in multiple bands within a same sub-frame in performing uplink carrier aggregation, wherein if the mobile station is unable to ensure the predetermined communication quality when transmitting uplink data signal via the multiple carriers in the multiple bands within the same sub-frame in performing uplink carrier aggregation, the radio base station performs scheduling that does not transmit uplink data signal via the multiple carriers in the multiple bands and performs scheduling that transmits uplink data signal via multiple carriers in a same band, wherein the mobile station is unable to transmit uplink data signal via the multiple carriers in the multiple bands, when the radio base station allocates the multiple carriers in the multiple bands to the mobile station, the mobile station transmits uplink data signal via a carrier in a same band as a carrier which an important signal is transmitted.

7. A mobile communication method in a mobile communication system for performing uplink carrier aggregation by using carriers of different frequencies, the mobile communication method comprising the steps of:

transmitting simultaneous transmission capability information from a mobile station to a radio base station, the simultaneous transmission capability information indicating whether or not the mobile station is able to transmit uplink data signal via multiple carriers transmitted from multiple antennas within a same sub-frame in performing uplink carrier aggregation; and performing scheduling for the mobile station by the radio base station based on the simultaneous transmission capability information, wherein if the mobile station is unable to transmit uplink data signal via the multiple carriers transmitted from the multiple antennas within the same sub-frame in performing uplink carrier aggregation, the radio base station performs scheduling that does not transmit uplink data signal via the multiple carriers transmitted from the multiple antennas and performs scheduling that transmits uplink data signal via multiple carriers transmitted from a same antenna, wherein the mobile station is unable to transmit uplink data signal via the multiple carriers transmitted from the multiple antennas, when the radio base station allocates the multiple carriers transmitted from the multiple antennas to the mobile station, the mobile station transmit uplink data signal via a carrier in a same band as a carrier which an important signal is transmitted.

8. A mobile communication method in a mobile communication system for performing up/ink carrier aggregation by using carriers of different frequencies, the mobile communication method comprising the steps of:

transmitting simultaneous transmission capability information from a mobile station to a radio base station, the simultaneous transmission capability information indicating whether or not the mobile station is able to ensure a predetermined communication quality when transmitting uplink data signal via multiple carriers transmitted from multiple antennas within a same sub-frame in performing uplink carrier aggregation; and performing scheduling for the mobile station by the radio base station based on the simultaneous transmission capability information, wherein if the mobile station is unable to ensure the predetermined communication quality when transmitting uplink data signal via the multiple carriers transmitted from the multiple antennas within the same sub-frame in performing uplink carrier aggregation, the radio base station performs scheduling that does not transmit uplink data signal via the multiple carriers transmitted from the multiple antennas and performs scheduling that transmits uplink data signal via multiple carriers transmitted from a same antenna, wherein the mobile station is unable to transmit uplink data signal via the multiple carriers transmitted from the multiple antennas, when the radio base station allocates the multiple carriers transmitted from the multiple antennas to the mobile station, the mobile station transmit uplink data signal via a carrier in a same band as a carrier which an important signal is transmitted.

9. A radio base station used in a mobile communication system for performing uplink carrier aggregation using carriers of different frequencies, the radio base station comprising:

a receiver unit configured to receive simultaneous transmission capability information from a mobile station, the simultaneous transmission capability information indicating whether or not the mobile station is able to transmit uplink data signal via multiple carriers transmitted from multiple antennas within a same sub-frame in performing uplink carrier aggregation; and a scheduling unit configured to perform scheduling for the mobile station based on the simultaneous transmission capability information, if the mobile station is unable to transmit uplink data signal via the multiple carriers transmitted from the multiple antennas within the same sub-frame in performing uplink carrier aggregation, the radio base station performs scheduling that does not transmit uplink data signal via the multiple carriers transmitted from the multiple antennas and performs scheduling that transmits uplink data signal via multiple carriers transmitted from a same antenna, wherein the mobile station is unable to transmit uplink data signal via the multiple carriers transmitted from the multiple antennas, when the radio base station allocates the multiple carriers transmitted from the multiple antennas to the mobile station, the mobile station transmit uplink data signal via a carrier in a same band as a carrier which an important signal is transmitted.

10. A radio base station used in a mobile communication system for performing uplink carrier aggregation using carriers of different frequencies, the radio base station comprising:

a receiver unit configured to receive simultaneous transmission capability information from a mobile station, the simultaneous transmission capability information indicating whether or not the mobile station is able to ensure a predetermined communication quality when transmitting uplink data signal via multiple carriers transmitted from multiple antennas within a same sub-frame in performing uplink carrier aggregation; and a scheduling, unit configured to perform scheduling, for the mobile station based on the simultaneous transmission capability information, if the mobile station is unable to ensure the predetermined communication quality when transmitting uplink data signal via the multiple carriers transmitted from the multiple antennas within the same sub-frame in performing uplink carrier aggregation, the radio base station performs scheduling that does not transmit uplink data signal via the multiple carriers transmitted from the multiple antennas and performs scheduling that transmits uplink data signal via multiple carriers transmitted from a same antenna, wherein the mobile station is unable to transmit uplink data signal via the multiple carriers transmitted from the multiple antennas, when the radio base station allocates the multiple carriers transmitted from the multiple antennas to the mobile station the mobile station transmit uplink data signal via a carrier in a same band as a carrier which an important signal is transmitted.

11. A mobile station used in a mobile communication system for performing uplink carrier aggregation using carriers of different frequencies, the mobile station comprising a transmitter unit configured to transmit simultaneous transmission capability information to a radio base station, the simultaneous transmission capability information indicating whether or not the mobile station is able to transmit uplink data signal via multiple carriers transmitted from multiple antennas within a same sub-frame in performing uplink carrier aggregation, if the mobile station is unable to transmit uplink data signal via the multiple carriers transmitted from the multiple antennas within the same sub-frame in performing uplink carrier aggregation, the radio base station performs scheduling that does not transmit uplink data signal via the multiple carriers transmitted from the multiple antennas and performs scheduling that transmits uplink data signal via multiple carriers transmitted from a same antenna, wherein the mobile station is unable to transmit uplink data signal via the multiple carriers transmitted from the multiple antennas, when the radio base station allocates the multiple carriers transmitted from the multiple antennas to the mobile station, the mobile station transmit uplink data signal via a carrier in a same band as a carrier which an important signal is transmitted.

12. A mobile station used in a mobile communication system for performing uplink carrier aggregation using carriers of different frequencies, the mobile station comprising a transmitter unit configured to transmit simultaneous transmission capability information to a radio base station, the simultaneous transmission capability information indicating whether or not the mobile station is able to ensure a predetermined communication quality when transmitting uplink data signal via multiple carriers transmitted from multiple antennas within a same sub-frame in performing uplink carrier aggregation, wherein if the mobile station is unable to ensure the predetermined communication quality when transmitting uplink data signal via the multiple carriers transmitted from the multiple antennas within the same sub-frame in performing uplink carrier aggregation, the radio base station performs scheduling that does not transmit uplink data signal via the multiple carriers transmitted from the multiple antennas and performs scheduling that transmits uplink data signal via multiple carriers transmitted from a same antenna, wherein the mobile station is unable to transmit uplink data signal via the multiple carriers transmitted from the multiple antennas, when the radio base station allocates the multiple carriers transmitted from the multiple antennas to the mobile station, the mobile station transmit unlink data signal via a carrier in a same band as a carrier which an important signal is transmitted.

* * * * *